US008838924B2

(12) United States Patent
Henry et al.

(10) Patent No.: US 8,838,924 B2
(45) Date of Patent: Sep. 16, 2014

(54) MICROPROCESSOR HAVING INTERNAL SECURE MEMORY

(75) Inventors: G. Glenn Henry, Austin, TX (US); Terry Parks, Austin, TX (US)

(73) Assignee: Via Technologies, Inc., New Taipei (TW)

( * ) Notice: Subject to any disclaimer, the term of this patent is extended or adjusted under 35 U.S.C. 154(b) by 618 days.

(21) Appl. No.: 12/263,143

(22) Filed: Oct. 31, 2008

(65) Prior Publication Data
US 2009/0292894 A1 Nov. 26, 2009

Related U.S. Application Data

(60) Provisional application No. 61/055,980, filed on May 24, 2008.

(51) Int. Cl.
*G06F 12/00* (2006.01)
*G06F 21/72* (2013.01)
*G06F 21/70* (2013.01)

(52) U.S. Cl.
CPC ............... *G06F 21/72* (2013.01); *G06F 21/70* (2013.01)
USPC .............................. 711/163; 726/27; 713/166

(58) Field of Classification Search
USPC .............................. 711/163; 713/166; 726/27
See application file for complete search history.

(56) References Cited

U.S. PATENT DOCUMENTS

| 4,558,176 A | 12/1985 | Arnold et al. |
| 4,590,552 A | 5/1986 | Guttag et al. |
| 4,713,792 A | 12/1987 | Hartmann et al. |
| 4,888,802 A | 12/1989 | Cooney |
| 4,908,796 A | 3/1990 | Lee et al. |
| 4,974,208 A | 11/1990 | Nakamura et al. |
| 5,014,191 A | 5/1991 | Padgaonkar et al. |
| 5,057,999 A | 10/1991 | Kase et al. |
| 5,067,077 A | 11/1991 | Wakimoto et al. |
| 5,134,700 A | 7/1992 | Eyer et al. |

(Continued)

FOREIGN PATENT DOCUMENTS

EP 1612684 1/2006

OTHER PUBLICATIONS

Kean, Tom. "Secure Configuration of Field Programmable Gate Arrays." © Springer-Verlag Berlin Heidelberg 2001. pp 142-151.

(Continued)

*Primary Examiner* — Kalpit Parikh
(74) *Attorney, Agent, or Firm* — Richard K. Huffman; James W. Huffman

(57) ABSTRACT

An apparatus providing for a secure execution environment. The apparatus includes a microprocessor that is configured to execute non-secure application programs and a secure application program, where the non-secure application programs are accessed from a system memory via a system bus. The microprocessor has a non-secure memory and a secure volatile memory. The non-secure memory is configured to store portions of the non-secure application programs for execution by the microprocessor, where the non-secure memory is observable and accessible by the non-secure application programs and by system bus resources within the microprocessor. The secure volatile memory is configured to store the secure application program for execution by the microprocessor, where the secure volatile memory is isolated from the non-secure application programs and the system bus resources within the microprocessor. The secure application program is decrypted using a processor unique key and is written to the secure volatile memory.

24 Claims, 11 Drawing Sheets

(56) References Cited

U.S. PATENT DOCUMENTS

| | | | |
|---|---|---|---|
| 5,175,840 A | 12/1992 | Sawase et al. | |
| 5,251,304 A | 10/1993 | Sibigtroth et al. | |
| 5,274,778 A | 12/1993 | Hall | |
| 5,293,424 A | 3/1994 | Holtey et al. | |
| 5,293,610 A | 3/1994 | Schwarz | |
| 5,432,950 A | 7/1995 | Sibigtroth | |
| 5,446,864 A | 8/1995 | Burghardt et al. | |
| 5,465,341 A | 11/1995 | Doi et al. | |
| 5,533,123 A | 7/1996 | Force et al. | |
| 5,557,743 A | 9/1996 | Pombo et al. | |
| 5,615,263 A | 3/1997 | Takahashi | |
| 5,642,480 A | 6/1997 | Brownlee et al. | |
| 5,889,679 A | 3/1999 | Henry et al. | |
| 5,892,900 A | 4/1999 | Ginter et al. | |
| 5,953,502 A | 9/1999 | Helbig, Sr. | |
| 5,998,858 A | 12/1999 | Little et al. | |
| 6,115,816 A | 9/2000 | Davis | |
| 6,161,142 A | 12/2000 | Wolfe et al. | |
| 6,289,455 B1 | 9/2001 | Kocher et al. | |
| 6,330,668 B1 | 12/2001 | Curiger et al. | |
| 6,393,596 B1 | 5/2002 | Fischer et al. | |
| 6,581,162 B1 | 6/2003 | Angelo et al. | |
| 6,704,871 B1 | 3/2004 | Kaplan et al. | |
| 6,704,872 B1 | 3/2004 | Okada | |
| 6,775,778 B1 | 8/2004 | Laczko et al. | |
| 6,862,583 B1 | 3/2005 | Mazzagatte et al. | |
| 6,983,374 B2 | 1/2006 | Hashimoto et al. | |
| 6,986,052 B1 | 1/2006 | Mittal | |
| 7,013,484 B1 | 3/2006 | Ellison et al. | |
| 7,117,284 B2 | 10/2006 | Watt et al. | |
| 7,120,771 B2 | 10/2006 | Dahan et al. | |
| 7,124,170 B1 | 10/2006 | Sibert | |
| 7,130,951 B1 | 10/2006 | Christie et al. | |
| 7,131,001 B1 | 10/2006 | Johnson | |
| 7,165,180 B1 | 1/2007 | Ducharme | |
| 7,171,576 B2 | 1/2007 | McDevitt et al. | |
| 7,237,081 B2 | 6/2007 | Dahan et al. | |
| 7,340,573 B2 | 3/2008 | Watt | |
| 7,340,614 B2 | 3/2008 | Fujiwara et al. | |
| 7,389,427 B1 | 6/2008 | McKeen et al. | |
| 7,424,612 B2 | 9/2008 | England et al. | |
| 7,430,670 B1 | 9/2008 | Horning et al. | |
| 7,444,667 B2 | 10/2008 | Bulusu et al. | |
| 7,447,898 B2 | 11/2008 | Lee | |
| 7,457,960 B2 | 11/2008 | Kablotsky | |
| 7,500,098 B2 | 3/2009 | Paatero | |
| 7,519,830 B2 | 4/2009 | Mihm et al. | |
| 7,543,158 B2 | 6/2009 | Goss | |
| 7,613,924 B2 | 11/2009 | Shankar et al. | |
| 7,646,224 B2 | 1/2010 | Sundby | |
| 7,649,421 B2 | 1/2010 | Victor | |
| 7,661,104 B2 | 2/2010 | Watt et al. | |
| 7,681,046 B1 | 3/2010 | Morgan et al. | |
| 7,694,151 B1 | 4/2010 | Johnson et al. | |
| 7,730,248 B2 | 6/2010 | Goss et al. | |
| 7,757,098 B2 | 7/2010 | Brannock et al. | |
| 7,917,788 B2 | 3/2011 | May | |
| 8,468,364 B2 | 6/2013 | Goto | |
| 8,479,014 B1 | 7/2013 | Hu | |
| 2003/0061496 A1 | 3/2003 | Ananda | |
| 2003/0126442 A1* | 7/2003 | Glew et al. | 713/170 |
| 2003/0140205 A1 | 7/2003 | Dahan et al. | |
| 2004/0030615 A1 | 2/2004 | Ling | |
| 2004/0123118 A1 | 6/2004 | Dahan et al. | |
| 2004/0177260 A1 | 9/2004 | Gilfix et al. | |
| 2004/0205370 A1 | 10/2004 | McDevitt et al. | |
| 2004/0208318 A1 | 10/2004 | Henry et al. | |
| 2004/0250063 A1 | 12/2004 | Gulick et al. | |
| 2005/0021944 A1 | 1/2005 | Craft et al. | |
| 2005/0033969 A1 | 2/2005 | Kilveri et al. | |
| 2005/0066355 A1 | 3/2005 | Cromer et al. | |
| 2005/0091652 A1 | 4/2005 | Ross et al. | |
| 2005/0160210 A1 | 7/2005 | Watt et al. | |
| 2005/0278549 A1 | 12/2005 | Torla et al. | |
| 2006/0015748 A1 | 1/2006 | Goto et al. | |
| 2006/0015749 A1 | 1/2006 | Mittal | |
| 2006/0015947 A1 | 1/2006 | Conti et al. | |
| 2006/0021035 A1 | 1/2006 | Conti et al. | |
| 2006/0053080 A1 | 3/2006 | Edmonson et al. | |
| 2006/0075236 A1 | 4/2006 | Marek et al. | |
| 2006/0085710 A1 | 4/2006 | Spica et al. | |
| 2006/0090084 A1* | 4/2006 | Buer | 713/189 |
| 2006/0123184 A1* | 6/2006 | Mondal et al. | 711/6 |
| 2006/0129845 A1 | 6/2006 | Nakashima et al. | |
| 2006/0151990 A1 | 7/2006 | Cowburn | |
| 2006/0173701 A1 | 8/2006 | Gurvey | |
| 2006/0179324 A1 | 8/2006 | Hatakeyama | |
| 2006/0282899 A1 | 12/2006 | Raciborski | |
| 2007/0006150 A9 | 1/2007 | Walmsley | |
| 2007/0016766 A1 | 1/2007 | Richmond et al. | |
| 2007/0033419 A1 | 2/2007 | Kocher et al. | |
| 2007/0061597 A1 | 3/2007 | Holtzman et al. | |
| 2007/0069875 A1 | 3/2007 | Doi | |
| 2007/0074276 A1* | 3/2007 | Harrison et al. | 726/4 |
| 2007/0136570 A1 | 6/2007 | Frank et al. | |
| 2007/0172053 A1 | 7/2007 | Poirier | |
| 2007/0182575 A1 | 8/2007 | Kunemund | |
| 2007/0186117 A1 | 8/2007 | Klein et al. | |
| 2007/0198851 A1 | 8/2007 | Goto | |
| 2007/0213028 A1 | 9/2007 | Shohara et al. | |
| 2007/0226795 A1 | 9/2007 | Conti et al. | |
| 2007/0237325 A1 | 10/2007 | Gershowitz et al. | |
| 2007/0283361 A1 | 12/2007 | Blanchet et al. | |
| 2007/0294494 A1 | 12/2007 | Conti et al. | |
| 2007/0294496 A1 | 12/2007 | Goss et al. | |
| 2007/0297606 A1* | 12/2007 | Tkacik et al. | 380/239 |
| 2008/0034350 A1 | 2/2008 | Conti | |
| 2008/0100224 A1 | 5/2008 | Felder et al. | |
| 2008/0272808 A1 | 11/2008 | Sundby | |
| 2008/0294951 A1 | 11/2008 | Ahmad et al. | |
| 2008/0307240 A1 | 12/2008 | Dahan et al. | |
| 2008/0315961 A1 | 12/2008 | Victor | |
| 2009/0049220 A1 | 2/2009 | Conti et al. | |
| 2009/0055612 A1 | 2/2009 | Sibert | |
| 2009/0083372 A1 | 3/2009 | Teppler | |
| 2009/0157936 A1 | 6/2009 | Goss et al. | |
| 2009/0164800 A1 | 6/2009 | Johansson et al. | |
| 2009/0164961 A1 | 6/2009 | Goss et al. | |
| 2009/0172393 A1 | 7/2009 | Tanik et al. | |
| 2009/0177826 A1 | 7/2009 | Conti et al. | |
| 2009/0259857 A1 | 10/2009 | Gehrmann | |
| 2009/0328195 A1 | 12/2009 | Smith | |
| 2010/0020968 A1 | 1/2010 | Jin et al. | |
| 2010/0023782 A1 | 1/2010 | Prakash et al. | |
| 2010/0057960 A1 | 3/2010 | Renno | |
| 2011/0098075 A1 | 4/2011 | Bienas et al. | |
| 2011/0142236 A1 | 6/2011 | Nica | |

OTHER PUBLICATIONS

Yee, Bennet et al. "Secure Coprocessors in Electronic Commerce Applications." In Proceedings of the 1st USENIX Workshop on Electronic Commerce, Jul. 1995. pp. 155-170.

Suh, G. Edward et al. "AEGIS: A Single-Chip Secure Processor." Information Security Technical Report, Elsevier Ltd. vol. 10. 2005. pp. 63-73.

* cited by examiner

SECURE EXECUTION MODE MICROPROCESSOR DETAILS

MICROPROCESSOR HAVING INTERNAL SECURE MEMORY

CROSS-REFERENCE TO RELATED APPLICATIONS

This application claims the benefit of U.S. Provisional Application Ser. No. 61/055,980, filed on May 24, 2008, which is herein incorporated by reference for all intents and purposes.

This application is related to the following co-pending U.S. Patent Applications, each of which has a common assignee and common inventors.

| SERIAL NUMBER | FILING DATE | TITLE |
|---|---|---|
| (CNTR.2322) | Oct. 31, 2008 | MICROPROCESSOR HAVING SECURE NON-VOLATILE STORAGE ACCES |
| (CNTR.2437) | Oct. 31, 2008 | MICROPROCESSOR APPARATUS PROVIDING FOR SECURE INTERRUPTS AND EXCEPTIONS |
| (CNTR.2438) | Oct. 31, 2008 | MICROPROCESSOR APPARATUS FOR SECURE ON-DIE REAL-TIME CLOCK |
| (CNTR.2439) | Oct. 31, 2008 | ON-DIE CRYPTOGRAPHIC APPARATUS IN A SECURE MICROPROCESSOR |
| (CNTR.2444) | Oct. 31, 2008 | APPARATUS AND METHOD FOR ISOLATING A SECURE EXECUTION MODE IN A MICROPROCESSOR |
| (CNTR.2445) | Oct. 31, 2008 | MICROPROCESSOR PROVIDING ISOLATED TIMERS AND COUNTERS FOR EXECUTION OF SECURE CODE |
| (CNTR.2446) | Oct. 31, 2008 | INITIALIZATION OF A MICROPROCESSOR PROVIDING FOR EXECUTION OF SECURE CODE |
| (CNTR.2447) | Oct. 31, 2008 | MICROPROCESSOR APPARATUS AND METHOD FOR PERSISTENT ENABLEMENT OF A SECURE EXECUTION MODE |
| (CNTR.2466) | Oct. 31, 2008 | TERMINATION OF SECURE EXECUTION MODE IN A MICROPROCESSOR PROVIDING FOR EXECUTION OF SECURE CODE |
| (CNTR.2469) | Oct. 31, 2008 | APPARATUS AND METHOD FOR MANAGING A MICROPROCESSOR PROVIDING FOR A SECURE EXECUTION MODE |
| (CNTR.2470) | Oct. 31, 2008 | APPARATUS AND METHOD FOR DISABLING A MICROPROCESSOR THAT PROVIDES FOR A SECURE EXECUTION MODE |
| (CNTR.2471) | Oct. 31, 2008 | DEGRADED MODE OPERATION OF A MICROPROCESSOR THAT PROVIDES FOR A SECURE EXECUTION MODE |
| (CNTR.2478) | Oct. 31, 2008 | APPARATUS AND METHOD FOR PRECLUDING EXECUTION OF CERTAIN INSTRUCTIONS IN A SECURE EXECUTION MODE MICROPROCESSOR |

BACKGROUND OF THE INVENTION

1. Field of the Invention

This invention relates in general to the field of microelectronics, and more particularly to a microprocessor that provides a secure execution mode of operation that allows code to be executed in a highly secure environment within the microprocessor itself.

2. Description of the Related Art

The use of desktop, laptop, and handheld computing and communication devices as platforms for digital communication of sensitive or proprietary data and digital rights controlled content continues to drive security innovations in the computing industry. For example, there are numerous applications which are disturbed at no cost over the Internet for the purposes of downloading and managing digital audio and video files. Through these applications, a user is allowed limited rights to songs, television shows, and movies. And a great deal of attention is paid to protecting those rights through the use of security features built into the applications which often rely on security mechanisms provided by their host platforms.

In addition to the protection of digital content rights, another factor which continues to drive improvements in computer system security is use restrictions which may be applied to the host platforms themselves. It is a well known fact that the cell phone industry has provided for so-called "pay-as-you-go" use of particular communication devices. With such a plan, a user pays no monthly fee, but instead pre-pays for a certain number of cellular minutes. When the minutes are exhausted, the user is denied access to the cellular network for any calls other than emergency calls.

As early as 2006, MICROSOFT® Corporation along with partner corporations, began to provide "pay-as-you-go" personal computing which is primarily directed toward emerging computer markets. Under this scheme, a user pays for their computer as it is used, through the purchase of prepaid cards. In addition, U.S. Patent Application Publication 20060282899, which is assigned to MICROSOFT, describes a system and method for delivery of an modular operating system, which includes a core function module, or basic kernel, providing fundamental operating system support and one or more add-on modules that allow customization of the operating system as desired. In this application, add-on modules may provide support or extended capability to the computer including hardware, applications, peripherals, and support. A digital signature may be used to confirm the integrity of an add-on module prior to installation, and certification may be verified to determine if installation of the add-on module is authorized. By withholding certification, a service provider may manage illegal or undesired modifications to a provided computer. In addition, digital rights management may be used to enforce terms of use of the add-on module in keeping with licensing arrangements.

Not surprisingly, a veritable host of techniques have been developed as well which provide for circumventing the security measures that are now in place to protect and control access to rights controlled digital media, communication devices, and computing platforms. In more recent times, "hacking" has become a bona fide field of study. In fact, the present inventors have noted the publication of numerous works which are dedicated to tampering with or altogether defeating the security measures that have been put into place to safeguard access to and/or use of protected assets. One such work is the book, *Hacking the Xbox: An Introduction to Reverse Engineering* by Andrew Huang, San Francisco: No Starch Press, 2003. The book focuses in particular on teaching hacking techniques to overcome the security mechanisms of the XBOX® gaming platform produced by MICROSOFT, and additionally provides significant teaching on the subjects of computer security and reverse engineering in general, with a discussion of the vulnerabilities of so-called "secure" computing platforms.

Consequently, platform architects and designers continue to pursue techniques and mechanisms that are more effective at protecting against unauthorized platform access, regardless of whether the access is benign (e.g., probing, snooping), malicious (e.g., destructive or rights-defeating hacks), or somewhere in between (e.g., tampering). Many of these mechanisms are directed at preventing an intruder from physically accessing a platform, such as housing the platform in a secure chassis (e.g., a locked metal enclosure) or encapsulating vulnerable circuits in epoxy. But it is well known that these types of techniques add both cost and complexity to a system. Alternative mechanisms utilize security features that are provided for in a particular computer architecture itself.

Consider the two primary security features provided for by the well-known x86 architecture: paged virtual memory and privileged execution. Under paged virtual memory, the underlying operating system defines a separate virtual address space along with access rights (e.g., execute only, read only) for each application that is being executed, thus precluding another surreptitious application from executing within the defined space or modifying its data. But the data associated with virtual address translation (i.e., page tables) can be easily snooped and changed since the data is resident in system memory and is presented external to the host microprocessor on its system bus.

With privileged execution, the architecture provides several levels of execution privileges, CPL0 through CPL3. Accordingly, certain system resources and instructions may only be accessed by applications which are executing at higher privilege levels. It is common to find operating system components operating at the highest privilege level, CPL0, and user applications relegated to the lowest privilege level, CPL3. But as one skilled in the art will appreciate, these architectural features were developed primarily to preclude system crashes due to software bugs, and are not very effective at preventing intentional or directed hacks.

As a result, various methods and apparatus have been developed which are more closely concentrated toward the prevention of intentional intrusion or takeover of a platform. In U.S. Pat. No. 5,615,263, Takahashi teaches a secure mode within a dual mode processor (i.e., microprocessor). In a general/external mode, the dual mode processor executes instructions provided from an external source. The instructions are supplied to the processor via input/output to the processor. Upon receiving a special software or hardware interrupt, the dual mode processor enters a secure/internal mode. The interrupt specifies a secure function stored in a read-only memory within the dual mode processor. Upon receiving such an interrupt, input/output to the dual mode processor is disabled. The identified secure function is executed by the processor. During execution of the secure function, any attempt to insert instructions not originating from the read-only memory are ignored. However, the processor may access data specifically identified by secure function being executed. Upon completion of performance of the secure function, an exit routine is executed to enable input/output to the processor and resume execution of instructions provided via input/output from the source external to the processor.

Takahashi teaches that the secure mode is to be used for encryption and decryption and the dual mode processor relies upon normal instructions and data to be provided from an external control channel processor via a bus conforming to a standard bus architecture such as the Industry Standard Architecture (ISA). The dual mode processor powers up in non-secure mode and the secure mode is initiated via a software or a hardware interrupt. In secure mode, a limited number of functions (i.e., instructions) related to encryption and decryption can be executed. These functions are stored within a read-only memory (ROM) which is internal to the dual mode processor. As such, the present inventors have noted that Takashi's dual mode processor is inadequate in that it can only perform the limited number of functions which are provided for within it's internal ROM. Thus, an application comprising general purpose instructions cannot be executed in secure mode.

In U.S. Pat. No. 7,013,484, Ellison et al. teach a chipset for establishing a secure environment for an isolated execution mode by an isolated storage, which are accessible by at least one processor. The at least one processor has a plurality of threads and operates in normal execution mode or the isolated execution mode. The secure environment of Ellison et al. relies upon an external chipset ("isolated execution circuit") which provides the mechanism for a processor to operate in isolated execution mode. The external chipset thus configures a secure memory area, it handles decoding and translation of isolated instructions, generation of isolated bus cycles, and generation of interrupts. While the external chipset indeed provides for proactive steps to isolate memory areas, instruction execution, and the like, it is noted that the external chipset is coupled to the at least one processor via a typical system bus, thus allowing for bus snooping and tampering with traffic on the bus itself during execution of any secure thread.

In U.S. Pat. No. 7,130,951, Christie et al. teach a method for controlling a secure execution mode-capable processor including a plurality of interrupts to interrupt the secure execution mode-capable processor when it is operating in a non-secure execution mode. The method includes disabling the plurality of interrupts from interrupting the secure execution mode-capable processor when it is operating in a secure execution mode. And while disabling interrupts is a desirable security feature in a secure execution environment, the processor according to Christie et al. relies upon instructions and data to be provided via an operating system over a system bus. Once the instructions are provided, then interrupts are disabled. Like the mechanism of Ellison et al., such an approach is clearly susceptible to bus snooping and tampering with any of the instructions which are passed to the processor over the bus.

In U.S. Pat. No. 6,983,374, Hashimoto et al. teach a tamper resistant microprocessor that saves context information for one program whose execution is to be interrupted, where the processor state is encrypted and stored to system memory. Hashimoto also teaches a technique for fetching encrypted instructions from system memory and apparatus for decrypting and executing the decrypted instructions. In addition, Hashimoto teaches using a symmetric key to provide the encrypted instructions in memory and then using an asymmetric key algorithm to encrypt the symmetric key, which is stored in memory. The symmetric key is known to the program creator and is encrypted using a public key that is read from the processor. The processor includes a unique private key that corresponds to the public key, which cannot be accessed by the user. Accordingly, upon execution of a branch instruction, program control is transferred to a "start encrypted execution" instruction which passes a pointer to the encrypted symmetric key. The processor fetches the encrypted symmetric key and decrypts it using its internal private key. Subsequently, the encrypted program instructions are fetched from system memory, decrypted using the decrypted symmetric key, and executed by the processor. If an interrupt or exception occurs, the state of the processor is symmetrically encrypted and saved to memory. Hashimoto teaches the use of common cache mechanisms, interrupt logic, and exception processing logic for both unencrypted and encrypted code.

The present inventors have noted that the microprocessor of Hashimoto is limiting in that the symmetric key corresponding to secure code is known by the code's creator, and could be compromised, thus exposing all systems having that code to security attacks. In addition, the present inventors have noticed that the processor of Hashimoto is disadvantageous in that decryption of secure code must be executed on the fly as instructions are fetched, which is extremely time consuming, thus causing throughput of the microprocessor to slow to a crawl. Furthermore, it is noted that the secure code of Hashimoto utilizes existing non-secure resources such as system memory, page tables, interrupt and exception mechanisms, all of which are subject to snooping.

Accordingly, the present inventors have noted that it is clearly desirable to provide a microprocessor which is capable of executing an application or application thread comprising general purpose instructions (i.e., any of the instructions in the microprocessor's instruction set) within a secure execution environment.

It is additionally desirable that the secure execution environment be isolated from any of the known methods of snooping and tampering. Thus, it is required that instructions executed by a secure execution mode microprocessor be isolated from hardware within the microprocessor that provides access such as cache snoops, system bus traffic, interrupts, and debug and trace features.

It is furthermore desirable when applications are loaded for secure execution by the microprocessor, that a mechanism is provided to obfuscate the structure and content of the applications from any extant observation means and that a mechanism be provided to authenticate the source of the application and to confirm its veracity.

SUMMARY OF THE INVENTION

The present invention, among other applications, is directed to solving the above-noted problems and addresses other problems, disadvantages, and limitations of the prior art. The present invention provides a superior technique over that which has heretofore been provided that enables the execution of secure application programs in a general purpose microprocessor platform. In one embodiment, an apparatus providing for a secure execution environment is presented. The apparatus includes a microprocessor, coupled to a system bus, that is configured to execute non-secure application programs and a secure application program, where the non-secure application programs are accessed from a system memory via the system bus, and where the microprocessor is also configured to automatically transition to a degraded mode where only BIOS instructions are allowed to execute in order to allow for user input and the display of messages. The microprocessor has a non-secure memory, a secure volatile memory, a cryptographic unit, and a processor key register. The non-secure memory is configured to store portions of the non-secure application programs for execution by the microprocessor, where the non-secure memory is observable and accessible by the non-secure application programs and by system bus resources within the microprocessor. The secure volatile memory is configured to store the secure application program for execution by the microprocessor, where the secure volatile memory is isolated from the non-secure application programs and the system bus resources within the microprocessor, and where the secure application program is retrieved from a secure non-volatile memory over a private bus, decrypted using a processor unique key, and is written to the secure volatile memory. The a cryptographic unit is isolated from the system bus and is disposed within execution logic in the microprocessor, and is configured to employ the processor unique key to decrypt the secure application program. The processor key register is coupled to the cryptographic unit, and is configured to store the processor unique key, where the processor key register can only be read by the cryptographic unit.

One aspect of the present invention contemplates a microprocessor apparatus, for executing secure code within a secure execution environment. The microprocessor apparatus has a secure non-volatile memory and a microprocessor. The secure non-volatile memory is coupled to a private bus and is configured to store a secure application program. The microprocessor is coupled to the private bus is configured to execute non-secure application programs and the secure application program, where the non-secure application programs are accessed from a system memory via a system bus, and where the secure application program is accessed from the secure non-volatile memory, and where transactions over the private bus are isolated from the system bus and corresponding system bus resources within the microprocessor, and where the microprocessor is also configured to automatically transition to a degraded mode where only BIOS instructions are allowed to execute in order to allow for user input and the display of messages, The microprocessor includes a non-secure memory, a secure volatile memory, a cryptographic unit, and a processor key register. The non-secure memory is configured to store portions of the non-secure application programs for execution by the microprocessor, where the non-secure memory is observable and accessible by the non-secure application programs and by system bus resources within the microprocessor. The secure volatile memory is configured to store the secure application program for execution by the microprocessor, where the secure volatile memory is isolated from the non-secure application programs and the system bus resources within the microprocessor, and where the secure application program is retrieved from the secure non-volatile memory, decrypted using a processor unique key, and is written to the secure volatile memory. The a cryptographic unit isolated from the system bus and is disposed within execution logic in the microprocessor, and is configured to employ the processor unique key to decrypt the secure application program. The processor key register is coupled to the cryptographic unit, and is configured to store the processor unique key, where the processor key register can only be read by the cryptographic unit.

Another aspect of the present invention comprehends a method for executing secure code within a secure execution environment. The method includes providing a secure non-volatile memory for storage of the secure code; storing the secure code within the secure non-volatile memory via private transactions accomplished over a private bus that is coupled to the secure non-volatile memory; and fetching the secure code from the secure non-volatile memory over the private bus for execution by a microprocessor, and employing a cryptographic unit disposed within the microprocessor to decrypt the secure code using a processor unique key, where the processor unique key is stored in a processor key register within the microprocessor, and where the processor key register can only be read by the cryptographic unit, and storing the secure code in a secure volatile memory, where the secure volatile memory and the cryptographic unit are isolated from non-secure code and system bus resources within the microprocessor. The microprocessor is also configured to automatically transition to a degraded mode where only BIOS instructions are allowed to execute in order to allow for user input and the display of messages. The private bus is isolated from all system bus resources within the microprocessor and external to the microprocessor. The private bus is observable and accessible exclusively by secure execution logic within the microprocessor.

Regarding industrial applicability, the present invention is implemented within a MICROPROCESSOR which may be used in a general purpose or special purpose computing device.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In view of the above background discussion on secure or isolated execution of application programs in a microprocessor and the associated present day techniques that are employed to prevent snooping, intrusion, tampering, or hacking, a discussion of the present invention will now be presented with reference to FIGS. 1-12.

Figure 1:
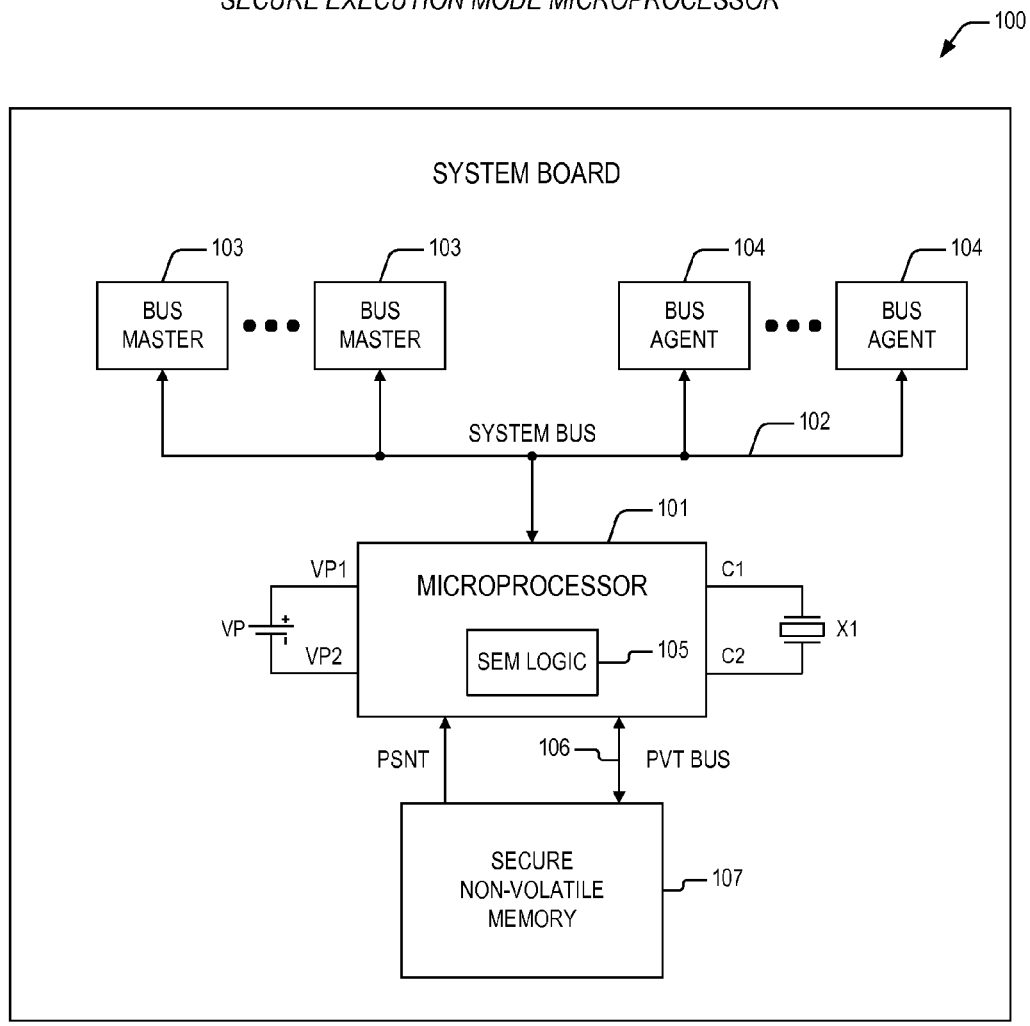
FIG. 1 is a block diagram illustrating a secure execution mode (SEM) microprocessor according to the present invention.

Referring to FIG. 1, a block diagram is presented illustrating a secure execution mode (SEM) microprocessor 101 according to the present invention. The block diagram depicts a system board 100 (or, "motherboard") to which the SEM microprocessor 101 is mounted. The microprocessor 101 is coupled to one or more bus masters 103 and/or to one or more bus agents 104 via a system bus 102. In one embodiment, the SEM microprocessor 101 is an x86-compatible microprocessor 101 that is coupled to one or more x86-compatible bus masters 103 and/or one or more x86-compatible bus agents 104 via an x86-compatible system bus 102.

In addition, the SEM microprocessor 101 is coupled to a battery VP that is mounted to the system board 100 and which couples to the microprocessor 101 via connections VP1 and VP2. In one embodiment, the voltage of battery VP is 1.8 VDC.

A crystal X1 is also mounted to the system board 100 and is coupled to the microprocessor 101 via connections C1 and C2. The microprocessor 101 includes SEM logic 105. The SEM logic 105 according to the present invention is configured to provide for initialization, operation, and termination of a secure execution mode within the microprocessor 101 as will be described in further detail herein below. The SEM logic 105 comprises logic, circuits, devices, or microcode (i.e., micro instructions or native instructions), or a combination of logic, circuits, devices, or microcode, or equivalent elements that are employed to initialize a secure execution mode, to load secure applications for execution, to execute those applications in a secure environment, to monitor a number of microprocessor and system attributes in order to detect and preclude tampering, to terminate the secure execution mode under appropriate conditions, and to halt processing altogether if tampering is detected. The elements employed to perform these functions, and other functions within the SEM logic 105 may be shared with other circuits, microcode, etc., that are employed to perform other functions within the microprocessor 101. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are first translated into associated micro instructions, and the associated micro instructions are then directly executed by a unit or units within the CISC microprocessor.

A secure non-volatile memory 107 is mounted to the system board 100 as well, and is coupled to the microprocessor 101 via a private serial bus PVT BUS 106 and a presence detection bus PSNT. According to the present invention, a non-volatile memory 107 is a memory whose contents persist through removal and reapplication of power. That is, the contents of the non-volatile memory 107 do not change when power to the system board is turned off or when it is turned on. In one embodiment, the secure non-volatile memory 107 comprises a flash read-only memory (ROM) that is sized commensurate with the size of the secure applications to be executed in secure execution mode. One embodiment contemplates a 4 MB flash ROM for the secure non-volatile memory 107. The transactions over PVT BUS are completely isolated from the system bus, the bus masters 103, and bus agents 104. In one embodiment, the flash ROM 107 can be programmed up to 100,000 times. In one embodiment, the private bus 106 contemplates a serial bus that provides for transactions between the secure non-volatile memory 107 and the microprocessor 101. Such a bus 106 may conform to a standard interface protocol such as the serial peripheral interface (SPI) protocol.

In operation, the battery VP and crystal X1 provide for persistent operation of a secure real time clock (RTC) (not shown) within the SEM logic 105, which will be described in more detail below. One or more secure application programs, comprising instructions from the host architecture instruction set, retrieved from system memory (not shown) over then system bus 102 and are stored into the non-volatile memory 107. In one embodiment, the one or more secure application programs are encrypted via an asymmetric cryptographic algorithm using a private key belonging to an authorizing entity and are accessed from the system memory in their encrypted form. One embodiment contemplates encryption of the one or more application programs via the RSA algorithm. A corresponding public key is employed by the microprocessor 101 to decrypt and validate the one or more secure application programs after they are fetched from the system memory. Upon enablement of secure execution mode and upon execution of a "start secure execution" instruction, the SEM logic 105 employs cryptographic resources within the microprocessor to encrypt the one or more secure application programs according to a symmetric key algorithm using a processor unique cryptographic key and transfers the encrypted one or more secure application programs to the non-volatile memory 107 over the private bus 106. Thereafter, the SEM logic 105 employs the cryptographic and other resources within the microprocessor 101 to access, validate, and decrypt the one or more secure application programs, which are then loaded into a secure and isolated random access memory (RAM), or cache (not shown) within the microprocessor 101.

When the start secure execution instruction executes, the SEM logic 105 disables all system resources which allow for observation and/or tampering including interrupts, debug exception logic, trace logic, and the like. The one or more application programs stored in the isolated internal RAM are executed using dedicated secure execution resources within the SEM logic 105. The one or more application programs may then return the processor state from secure operation mode to normal execution mode, or they may place the processor 101 in a degraded mode of execution with limited functionality if potential tampering is detected. If tampering is confirmed, then the SEM logic 105 causes the microprocessor 101 to shut down altogether.

The types of functions envisioned for the one or more secure application programs, or "secure code," include, but are not limited to, performing critical security tasks such as verifying certificates, encrypting data, decrypting data; monitoring normal system software activities; verifying the integrity of normal system software; tracking resource usage; and controlling installation of new software.

One embodiment of the secure processing system according to the present invention contemplates a surface mounted microprocessor 101, a surface mounted secure non-volatile memory 107, and a surface mounted crystal X1. These surface mounted components comprise ball-grid array components or like technology which are soldered onto the system board 101, thus precluding their removal via inexpensive methods.

The microprocessor 101 according to the present invention also executes non-secure application programs which are stored in system memory (not shown), the instructions of which are provided over the system bus 102. In the sense of the present application, the microprocessor 101 is capable of performing as a centralized processing unit (CPU) without a requirement for a coprocessor. That is, the microprocessor 101 according to the present invention is capable of executing all of the instructions in the host instruction set and is capable of executing entire application programs. In contrast to coprocessors and processors of like function, which only executed single instructions, program threads, or program snippets that are handed off from a main CPU, the microprocessor 101 according to the present invention directly executes all of the instructions in a corresponding application program, regardless of whether that application program is a secure application program provided via the secure non-volatile memory 107 or a non-secure application program fetched over the system bus 102.

Figure 2:
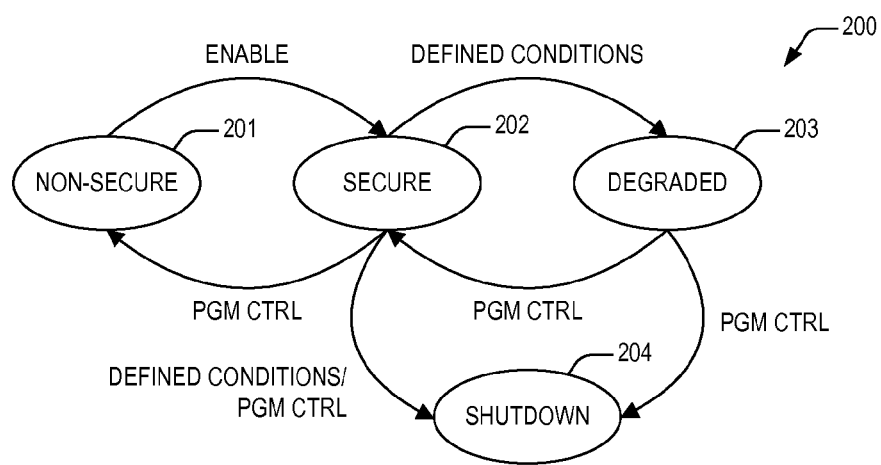
FIG. 2 is a state diagram depicting top-level operating mode transitions in the microprocessor of FIG. 1.

Turning now to FIG. 2, a state diagram 200 is presented depicting top-level operating mode transitions in the microprocessor of FIG. 1. At a high level, the microprocessor 101 according to the present invention provides for three primary operating modes 201-203 and a shutdown mode 204. A non-secure mode 201 is the first state that the microprocessor 101 defaults to when first powered up after fabrication. The non-secure mode 201 is also called "born free" mode 201. The born free mode 201 is the manufactured state of the microprocessor 101 and provides for normal execution of non-secure application programs, which are accessed in system memory via the system bus 102. In this state, none of the resources associated with secure execution of secure application programs are observable (i.e., visible to the non-secure applications) or operational. These resources include the SEM logic 105, the secure memory 107, and a number of other dedicated registers including registers containing symmetric and asymmetric cryptographic keys, secure interrupts, secure memory (RAM), and other hardware which will be discussed in further detail below. By providing the born free mode, the type of manufacturing activities common to a non-secure microprocessor may be applied. In addition, since the born free mode 201 provides for the execution of non-secure application programs, the same die design for the microprocessor 101 according to the present invention may be applied to a non-secure microprocessor. In one embodiment, the pinout of the non-secure microprocessor is different from the SEM microprocessor 101 and if a non-secure version of the microprocessor is mounted to a secure system board 100, then the SEM logic 105 within the non-secure microprocessor will render itself inoperable upon application of power.

In one embodiment, execution of a SEMENABLE instruction causes the mode of the microprocessor 101 to transition to secure mode 202. In the secure mode 202, both secure and non-secure applications can be executed, but the non-secure applications do not have access to the secure resources. The secure mode 202 is also called the SEM-enabled mode 202. Under the control of a secure application, the state of the microprocessor may be changed back to the born free mode 201, however, the number of transitions back to born free mode 201 is finite. In one embodiment, the processor may transition back to born free mode 201 up to 64 times. In an alternative embodiment, a write to a particular machine specific register by a verifiable authorized entity cause the mode of the microprocessor 101 to transition to secure mode 202.

If certain defined conditions are detected by the SEM logic 105, then the processor 101 automatically transitions to degraded mode 203. In degraded mode 203, BIOS instructions are allowed to execute in order to allow for user input and the display of messages, but the execution of more complicated software such as an operating system is not allowed. Degraded mode 203 is provided so that secure code operating in the secure mode 202 the microprocessor 101 may be shut down relative to useful work, but BIOS instructions are still allowed to execute. In one embodiment, BIOS may be executed by forcing an external interrupt and communicating status via a machine specific register. In an x86-compatible embodiment, the SMI interrupt is forced in this mode 203 to cause BIOS to execute.

The defined conditions that cause the microprocessor 101 to transition from secure mode 202 to degraded mode 203 may be the result of the execution of secure code, or hardware detected conditions, or a combination of secure code results and hardware detected conditions. The hardware detected conditions comprise monitored conditions associated with potential security exposure or tampering. In addition, secure code executing in the degraded mode 203 may cause the state to transition back to secure mode 202.

Certain defined conditions related to configuration and integrity checks may cause the processor 101 to transition to a hard shutdown mode 204. This mode can only be exited by a processor reset. Under the control of a secure application program in either secure mode 202 or degraded mode 203, the microprocessor 101 may enter the hard shutdown mode 204.

If certain defined conditions are detected by the SEM logic 105, then the processor 101 automatically transitions to degraded mode 203. In degraded mode 203, BIOS instructions are allowed to execute in order to allow for user input and the display of messages, but the execution of more complicated software such as an operating system is not allowed. Degraded mode 203 is provided so that secure code operating in the secure mode 202 the microprocessor 101 may be shut down relative to useful work, but BIOS instructions are still allowed to execute. In one embodiment, BIOS may be executed by forcing an external interrupt and communicating status via a machine specific register. In an x86-compatible embodiment, the SMI interrupt is forced in this mode 203 to cause BIOS to execute.

The defined conditions that cause the microprocessor 101 to transition from secure mode 202 to degraded mode 203 may be the result of the execution of secure code, or hardware detected conditions, or a combination of secure code results and hardware detected conditions. The hardware detected conditions comprise monitored conditions associated with potential security exposure or tampering. In addition, secure code executing in the degraded mode 203 may cause the state to transition back to secure mode 202.

Certain defined conditions related to configuration and integrity checks may cause the processor 101 to transition to a hard shutdown mode 204. This mode can only be exited by a processor reset. Under the control of a secure application program in either secure mode 202 or degraded mode 203, the microprocessor 101 may enter the hard shutdown mode 204.

Figure 3:
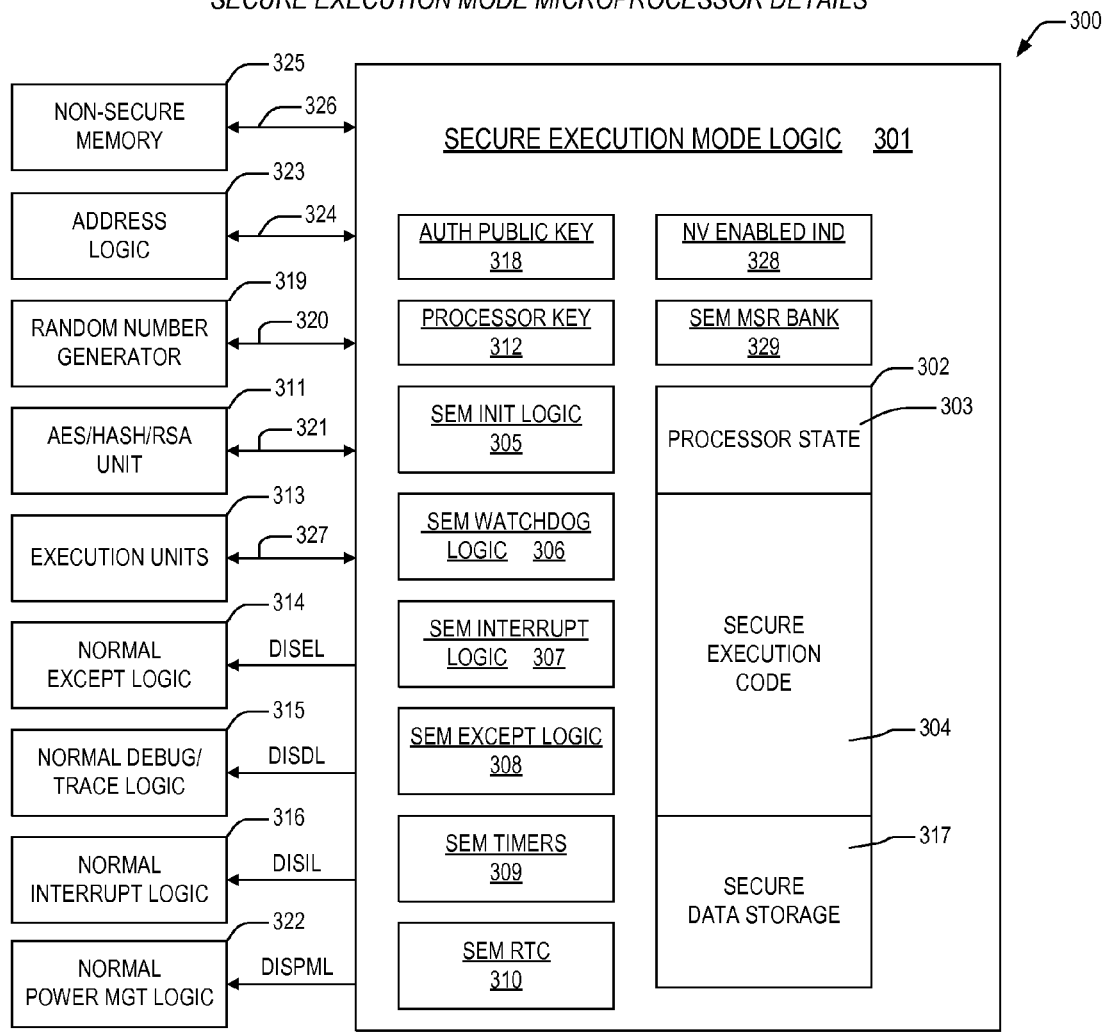
FIG. 3 is a block diagram illustrating details of SEM logic within the microprocessor according to the present invention.

Now referring to FIG. 3, a block diagram is presented illustrating details of SEM logic 301 within the microprocessor 301 according to the present invention. The SEM logic 301 includes and authorized party public key register 301, a unique processor symmetric key register 312, SEM initialization logic 305, SEM watchdog logic 306, SEM interrupt logic 307, SEM exception logic 308, SEM timers 309, a SEM real time clock (RTC) 310, a non-volatile enabled indication register 328, a bank of SEM machine specific registers 329, and a secure volatile memory 302. The SEM logic 301 is coupled to a number of other resources within the microprocessor 300 to include a non-secure memory 325 via bus 326, address logic 323 via bus 324, a random number generator 319 via bus 320, an AES/Hash/RSA unit 311 via bus 321, other processor execution units 313 (e.g., integer unit, floating point unit, MMX/SSE units) via bus 327, normal mode exception logic 314, normal mode trace/debug logic 315, normal mode interrupt logic 316, and normal power management logic 322.

In one embodiment, a public key is provided by an authorizing party and may be permanently programmed into the authorized public key register 318 during fabrication of the microprocessor 300. In one embodiment, the public key is a 1024-bit RSA key and the authorized public key register 301 comprises a 1024-bit fuse bank. Thus, the key can be programmed during fabrication of the microprocessor 300, but not thereafter. Alternatively, the public key can be programmed into the secure non-volatile memory 107 by an "off-line" mass initialization used to program a number of secure non-volatile memories 107. The ability to enable and initialize the secure mode 202 is a very critical security operation and presents a possible exposure to a Trojan Horse installation into the secure non-volatile memory 107. Thus, the public key is provided to control the secure mode initialization process in a manner that precludes observation and tampering.

The processor key register 312 is an aggregation of a plurality of fuses which are physically distributed over the microprocessor die. The fuses are programmed at fabrication time with a unique and randomly generated set of states to form a processor unique key which can only be read by the cryptography/hash/Montgomery Multiplication unit 311. There is no program interface that provides for reading the processor key from the key register 312. In one embodiment, the key register comprises 128 fuses programmed with a 128-bit Advanced Encryption Standard (AES) key which is employed to encrypt and decrypt the contents of the secure non-volatile memory 107. That is the secure code is encrypted using this key for storage in the secure non-volatile memory. Upon retrieval of the secure code via the private bus 106, the key from the processor key register 312 is employed to decrypt the secure code for execution. Consequently, an observer of the state of the private bus 106 would not be able to determine what is being transferred between the processor 300 and the non-volatile memory 107.

In one embodiment, the processor key register 312 comprises 128 poly fuses that are randomly distributed among the many other fuses within a fuse bank in the microprocessor 300. The fuse bank is configured below a number of metal layers on the microprocessor die.

The SEM initialization logic 305 provides for initialization of the secure mode 202 upon execution of the SEMENABLE instruction, or other contemplated mechanism for entering into the mode 202. For clarity purposes, operation of the microprocessor 300 according to the present invention will be described in terms of execution of instructions to enable (e.g., SEMENABLE) and executed code from the secure mode 202, however, on skilled in the art will appreciate that there are other methods which may be employed to enable the secure mode 202 and execute secure code therefrom such as a write to a hidden register, etc. Upon successful execution of a SEMENABLE instruction, the SEM initialization logic 305 records the state of the microprocessor 300 in the non-volatile enabled indicator register 328. Upon a return from secure mode 202 to the born free mode 201, the SEM initialization logic 305 records the state of the microprocessor 300 in the non-volatile enabled indicator register 328. In one embodiment, the non-volatile enabled indicator register 328 comprises a plurality of fuses and the number of times that the processor state can transition from secure mode 202 to born free mode 201 corresponds to the specific number of fuses within the plurality of fuses.

The SEM watchdog logic 306 is employed to monitor the veracity of the secure code and data and to monitor environmental and physical attributes of the system including temperature, voltage, bus frequency, presence of the battery VP, presence of the crystal X1, and presence of the secure non-volatile memory 107. The SEM watchdog logic 306 indicates tampering or suspected tampering conditions to the SEM logic 301, which may cause the processor to transition to degraded mode 203 or to shutdown mode 204.

The SEM interrupt logic 308 provides for a plurality of interrupts and associated interrupt logic (e.g., interrupt descriptor table (IDT)) which are visible and accessible only by applications which are executing in the secure mode 202. The mechanism for interrupting secure code execution is similar to that of executing normal mode execution. That is, upon assertion of a SEM interrupt, the secure code state is saved, and transfer to the secure interrupt handler occurs through the SEM IDT occurs. Execution of a return from interrupt instruction returns control to the interrupt point in the secure code.

Likewise, the SEM exception logic 308 provides for a plurality of exceptions and associated exception handling logic which are visible and accessible only by applications which are executing in the secure mode 202. All secure code program exceptions and interrupts employ the predefined IDT that is resident within the SEM interrupt logic 307 to control branching during interrupts and exceptions. The secure interrupts are configured to allow for program control transfer resulting from events external to the microprocessor 300 such as keyboard events, I/O port events, and the like. The secure exceptions are configured to allow for program control transfer resulting from events internal to the microprocessor 300 such as undefined opcodes, machine check errors, and in one embodiment, certain writes by secure code to one or more secure machine specific registers in the MSR bank 329. The secure IDT comprises a plurality of secure registers into which are loaded a plurality of pointers that point to secure interrupt and secure exception handlers within the secure code.

The SEM timers 309 are a plurality of timers which are visible and accessible only by applications which are executing in the secure mode 202. The SEM timers 309 include interrupts which are accessible by secure code operating in secure mode 202. The SEM real time clock (RTC) 310 is a persistent RTC that is visible and accessible only by applications which are executing in the secure mode 202. The value of the SEM RTC 310 cannot be changed by any entity other that secure code operating in secure mode 202. The SEM machine specific register (MSR) bank 329 comprises a plurality of MSRs which are visible and accessible only by applications which are executing in the secure mode 202. The MSRs 329 are employed to enable load/store access to the secure non-volatile memory 107, the SEM RTC 310, and the SEM timers 309.

The non-secure memory 325 is employed as both an instruction and data cache for non-secure applications that are executing. These programs and other system bus resources within the microprocessor 300 can observe and access the non-secure memory 325. The secure volatile memory 302 is employed as both an instruction and data cache for applications which are executing in the secure mode 202. An area of the secure memory 302 is provided to store processor state 303 upon entry into secure mode 202. And areas of the memory 302 are provided for storage of secure code 304 and data 317 corresponding to the secure code. The secure volatile memory 302 is cleared upon processor reset and it is entirely isolated from the system bus and therefore cannot be snooped, loaded, debugged, or otherwise accessed by non-secure system resources. Secure code can access the secure volatile memory 302 to load/store data 317 by using normal processor load and store instructions that reference normal segment registers within the address logic 323 which are initialized upon entry into secure execution to reference the secure volatile memory 302 instead of normal system memory (not shown). The normal system memory can also be accessed by secure code executing in secure mode using normal load and store instructions via the address logic 323. However, upon execution of the secure code, the SEM logic 301 directs the address logic 323 via bus 324 to cease address translation. That is, the addresses provided over bus 324 by the secure code must be physical addresses because virtual-to-physical address translation is disabled for both instructions and data. By doing so, the SEM logic precludes page faults, thereby eliminating this source of tampering.

In one embodiment, the secure volatile memory 302 resides completely within the on-chip caches in the microprocessor 300, but the secure memory cache lines have a special internal attribute that completely isolates them from the processor bus. These cache lines are not coupled to external system memory, and therefore they cannot be loaded from system memory or stored to system memory, nor can they be snooped—externally or internally—by any bus snoop resource.

In one embodiment, the secure volatile memory 302 comprises 4K 64-bit cache lines. A cache line within the secure volatile memory 302 is allocated by moving data to a cache line that has not been previously referenced.

In another embodiment, the secure volatile memory 302 comprises a random access memory that is separate from the on-chip caches within the microprocessor 300.

Execution of a SEMENTER instruction provides for execution of secure code within the secure mode 202. In an x86-compatible embodiment, the secure mode 202 provides for execution of secure code according to a modified 32-bit x86 real mode, but entry into x86 protected mode is precluded when secure code is executing. Prior to execution of secure code, the SEM initialization logic 305 disables non-secure (i.e., "normal") interrupt logic 316 by asserting signal DISIL. The SEM initialization logic 305 also disables normal exception logic 314 by asserting signal DISEL and normal debug/trace logic 315 by asserting signal DISDL. In addition, normal power management logic 322 is disabled via assertion of signal DISPML. Through these security measures, normal bus interrupts cannot occur, debug exceptions are precluded, bus trace cycles are prevented, debug ports are disabled. In addition, signal DISDL is employed to disable all remaining processor resources (e.g., JTAG, probe mode, cache test) during execution of secure code. The power management logic 322 would otherwise allow the microprocessor 300 to enter into reduced power states, such as P-state and C-state in an x86-compatible embodiment. Hence, signal DISPML is employed to prevent power state transitions during secure code execution.

Via buses 320, 321, and 327, the secure code can access all of the execution units 313 and special purpose units 319, 311 within the secure processor 300 to execute all of the instructions in the microprocessor's instruction set which include hardware generation of true random numbers and hardware implemented functions accessible by programmed macro instructions to perform RSA encryption, decryption, and signature verification; AES encryption and decryption; and SHA-1/SHA-256 hash generation. These hardware implemented functions are performed by the AES/HASH/RSA unit 311.

Figure 4:
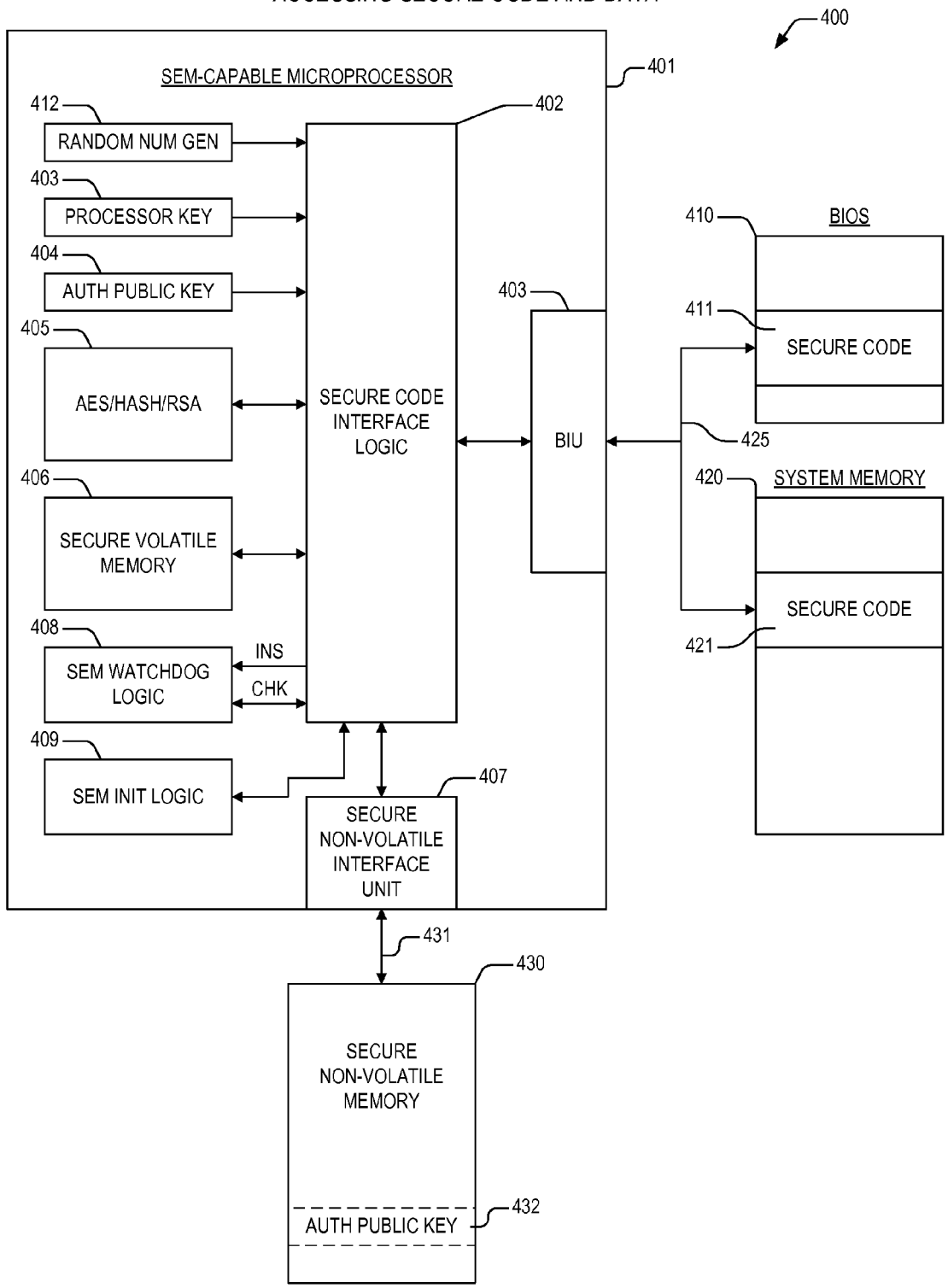
FIG. 4 is a block diagram showing how secure code is stored, accessed, initialized, and executed within the microprocessor according to the present invention.

Now referring to FIG. 4, a block diagram 400 is presented showing how secure code is stored, accessed, initialized, and executed within the microprocessor according to the present invention. The block diagram 400 depicts a SEM-capable microprocessor 401 that is coupled to BIOS memory 410 and system memory 420 via a system bus 425. The microprocessor 401 is also coupled to a secure non-volatile memory 430 according to the present invention via a private bus 431. The microprocessor 401 includes secure code interface logic 401 that is coupled to a random number generator 412, a processor key register 403, an authorized public key register 404, an AES/HASH/RSA unit 405 (or, "cryptographic unit" 405), secure volatile memory 406, SEM watchdog logic 408, and SEM initialization logic 409. The secure code interface logic 402 is additionally coupled to a bus interface unit 403 and to a secure non-volatile interface unit 407.

The block diagram 400 also depicts secure code 411, 421 which is stored in both system memory 420 and BIOS memory 410. In one embodiment, the secure code 411 stored within BIOS memory 410 is primarily employed to provide for operation of the microprocessor 401 in the degraded mode 203, and the secure code 421 stored in system memory 420 is employed for operation of the microprocessor 401 in secure mode 202.

In operation, elements depicted in the block diagram 400 function in a manner substantially similar to like-named elements presented and discussed previously with reference to FIGS. 1-3. The intention of this discussion with reference to FIG. 4 is to more specifically focus upon those elements and techniques that are employed to store, access, initialize, and execute secure code within a secure environment according to the present invention.

Accordingly, the environment for execution of secure code is isolated from the environment for execution of non-secure code. As stated previously, the born free mode 201 allows only for execution of non-secure code. The secure mode 202 allows for execution of both non-secure code and secure code. Prior to the execution of secure code 421, the state of the microprocessor 401 is saved. The state is restored upon transition back to the execution of non-secure code. This state is saved in an area within the secure volatile memory 406, and the state never appears on the processor bus 425. In addition, the secure code 411, 421 is executed from the secure volatile memory 406. In addition to isolating the secure volatile memory 406 from hardware and software associated with the processor bus 425, all other "side channels" such as debug exceptions and execution trace features, are disabled, as noted above in the discussion with respect to FIGS. 1-3. The secure code 411, 421 is provided with exclusive access to the SEM interrupt logic 307, the SEM exception logic 308, the SEM RTC 310, the SEM timers 310, and other processor resources that are available only to secure applications 411, 421.

In addition, the microprocessor 401 provides the SEM watchdog logic 408 that includes asynchronous monitors and watchdog mechanisms which execute independently of the execution of the secure code 411, 421 or non-secure code. The SEM watchdog logic 408 monitors the processor's environment (e.g., voltage, temperature, bus behavior) as well as verifying the integrity of the secure code 411, 421, as will be described in more detail below. When a security exposure is detected, the SEM watchdog logic 306 can transfer control to a secure-code error handler within the secure code 411, 421 via bus CHK or, in the case where a severe security exposure is detected, the SEM watchdog logic 306 will cause the microprocessor 401 to enter the degraded mode 203 via bus CHK.

In one embodiment, the secure code interface logic 402 monitors the specific instructions that are resident within the secure code 411, 421 and provides these instructions to the SEM watchdog logic 408 via bus INS in order to support restricted instruction set architecture (ISA) operation of the microprocessor 401. According to this embodiment, the microprocessor 401 according to the present invention is only allowed to execute certain instructions within the host ISA when it is operating in the secure execution mode. That is, restricted ISA operation precludes the execution of instructions that may present a security exposure for which the authorizing party wishes to preclude. For example, in an x86 embodiment, it may desirable to preclude the execution of certain instructions, or classes of instructions, which require the generation and execution of over, say, 100 microinstructions. On another hand, when the microprocessor 401 is operating in the secure execution mode, an authorizing party may wish to preclude the execution of all instructions such as task switches, call gates, and the like. By providing each of the instructions in the secure code 411, 421 to the SEM watchdog logic 408, the microprocessor 401 according to the present invention enables restricted ISA operation. In one embodiment, the instructions in the restricted ISA set (i.e., the instructions which are allowed for execution in the secure execution mode) are indicated by the value of an instruction array (not shown) within the SEM watchdog logic 408, as will be described in more detail below. When a precluded instruction is encountered, the SEM watchdog logic 408 causes the microprocessor 401 to enter the degraded mode 203.

In one embodiment, the secure code interface logic 402 provides the instructions in the secure code 411, 421 to the SEM watchdog logic concurrent with loading the secure code 411, 421 into the secure volatile memory 406 for subsequent execution.

The ability to enable and initialize the secure mode 202 is a very critical security operation and would otherwise present a possible exposure to a Trojan Horse installation into the area of memory 410, 420 containing the secure code 411, 421. Advantageously, the microprocessor 401 according to the present invention precludes such an exposure by controlling the secure mode initialization process via use of an asymmetric cryptographic algorithm and a corresponding set of asymmetric cryptographic keys. In one embodiment, the asymmetric key algorithm is the RSA algorithm and the corresponding keys are 1024-bit RSA public and private keys generated by the authorizing party. The authorizing party, or authorizing entity, in one embodiment, provides the secured code 411, 421 for execution. As noted above in the discussion with reference to FIG. 3, one of the two keys is stored during fabrication of the microprocessor 401 within the authorized public key register 318 and is employed to decrypt data according to the asymmetric key algorithm which was encrypted using the other asymmetric key (i.e., the private key) of the authorizing party.

Accordingly, in one embodiment, the operating system executes the SEMENABLE instruction (or similar mechanism). This instruction passes a SEM enable parameter which is encrypted via the private key of the authorizing entity. The secure code interface logic 402 then accesses the public key via the authorized public key register 404 and employs the AES/HASH/RSA unit 405 to decrypt the SEM enable parameter. Upon verification of the decrypted SEM enable parameter, the SEM initialization logic 409 initializes the secure mode 202. Otherwise the SEM initialization logic 409 directs the microprocessor 401 to returns from the SEMENABLE instruction and the microprocessor 401 remains in non-secure mode 201. In one embodiment, a return code is provided that indicates whether or not the authorization to enter secure mode 202 was accepted along with a corresponding error status (if any).

In an alternative embodiment, the authorizing party programs the authorized public key into an authorized public key area 432 of the secure non-volatile memory 430, as opposed to being directly programmed into the authorized public key register 404 during fabrication of the microprocessor 401. Accordingly, upon power up of the microprocessor 401, the public key is detected and retrieved from this area 432 by the secure non-volatile memory interface unit 407. The key is then burned into the authorized public key register 404 by the secure code interface logic 402 along with an parameter that indicates they key has been programmed. This alternative embodiment allows for a more flexible distribution of the public key at the level of fabrication of the secure non-volatile memory 430.

The SEMENABLE instruction (or alternative enable mechanism) also passes a pointer to the location of the secure code 411, 421 in BIOS memory 410 or system memory 420 along with any initial secure data. The pointer and data are formatted according to a predefined structure and are encrypted according to the asymmetric key algorithm as well. The encrypted pointer and data are decrypted and formatting is verified. Unsuccessful verification results in a return with error code.

If the pointer and data are confirmed and verified for structure, then the secure code interface logic 402 directs the bus interface unit 403 to retrieve the secure code 411, 420 from BIOS 410 and/or system memory 420. The secure code 411, 421 has also been encrypted according to the asymmetric key algorithm using the authorizing party private key and must comport with the predefined structure as well. The secure code interface logic 402 employs the authorized public key 404 and the AES/HASH/RSA unit 405 to decrypt the encrypted secure code 411, 421. Following verification of correct format, the secure code interface unit 402 employs the AES/HASH/RSA unit 405 to encrypt the secure code and data according to a symmetric cryptographic algorithm using the contents of the processor key register 403 as the symmetric key. As alluded to above, the contents of the processor key register 403 is a 128-bit randomly generated key that is unique to the microprocessor 401 and the symmetric cryptographic algorithm comprises the Advanced Encryption Algorithm (AES) using 128-bit blocks and electronic code book (ECB) mode. The symmetrically encrypted secure code is then written via the secure non-volatile memory interface unit 407 to the secure non-volatile memory 430. The interface unit 402 additionally employs the AES/HASH/RSA unit 405 and the processor key 403 to generate a plurality of hashes of selected portions of the secure code, and encrypts and writes these plurality of hashes to the secure non-volatile memory 430 as well. In one embodiment, the hashes are generated according to the SHA-1 algorithm, although other embodiments are contemplated.

Furthermore, the SEM initialization logic 409 disables JTAG, probe mode, cache test, and other processor features that would allow for observation of the secure code via the mechanisms discussed with reference to FIG. 3.

When the encrypted and hashed secure code has been written to the secure non-volatile memory 430, the microprocessor 401 sets the non-volatile enabled indicator (shown as 328 in FIG. 3) to indicate that the processor 401 is operating in secure mode 202 and the SEM initialization logic 409 forces the microprocessor 401 to perform a RESET sequence.

Part of the RESET sequence causes the contents of the non-volatile enable register 328 to be read, and if the contents indicate that the processor 401 is in secure mode 202, then additional operations are performed which are unique to operating in the secure mode 202.

Thus, the secure code 411, 421 is initially encrypted and loaded by the authorizing party into memory 410, 420. When secure mode 202 is enabled, the microprocessor 401 retrieves and verifies the secure code according to an asymmetric key algorithm using a key provided by the authorizing party. The code is then encrypted and hashed using a processor unique key according to a symmetric key algorithm, and the symmetrically encrypted code is then written to the private non-volatile memory 430 over the private bus 431.

As will be described in further detail below, when the secure code is to be executed, it is retrieved by the secure non-volatile memory interface unit 407 from the secure non-volatile memory 430 and decrypted using the processor key 403, and it written to the secure volatile memory 406 within the processor 401, which is totally isolated from all hardware and/or software which would otherwise provide visibility into its contents. The secure non-volatile memory 406 functions as both an instruction and data cache for execution of the secure applications.

In one embodiment, the secure non-volatile memory interface unit 407 comprises a plurality of machine specific registers that are made visible exclusively to secure code which allow a secure application (or the secure code interface logic 402) to perform loads and stores to the secure non-volatile memory 430. That is, reads and writes to the secure non-volatile memory 430, according to this embodiment, are performed by performing reads and writes to the hidden machine specific registers.

Advantageously, an authorizing party can bind secure operation of the microprocessor 401 to a secure mode environment and the structure and function of the secure code are protected from any reverse engineering and other tampering/hacking techniques because the transactions provided over both the system bus 425 and the private secure bus 431 are encrypted.

Figure 5:
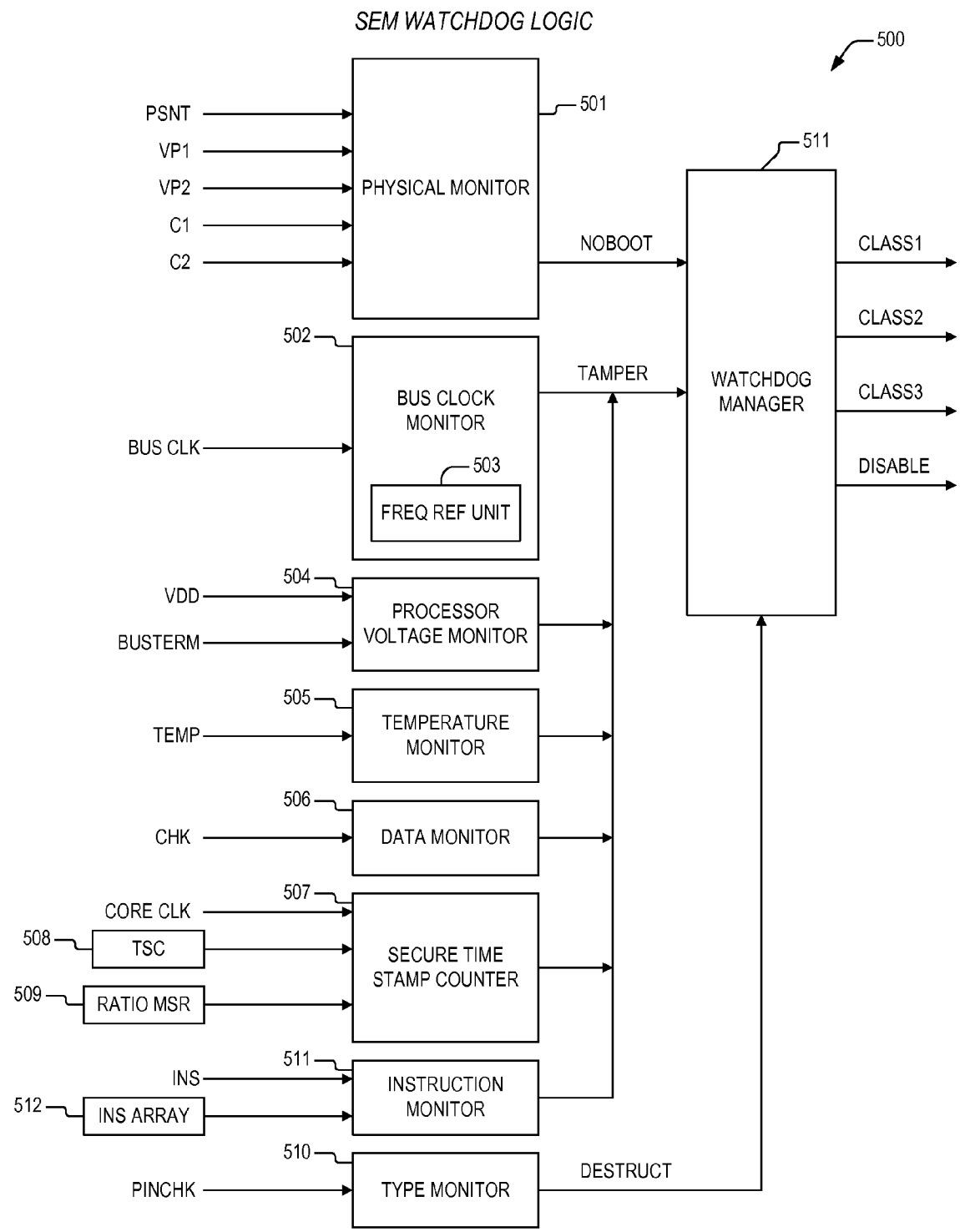
FIG. 5 is a block diagram illustrating details of SEM watchdog logic within the microprocessor of FIG. 1.

Referring now to FIG. 5, a block diagram is presented illustrating details of SEM watchdog logic 500 within the microprocessor of FIG. 1. The watchdog logic 500 includes a physical environment monitor 501 that is coupled to the secure non-volatile memory via signal PSNT, to the external battery via signals VP1 and VP2, and to the external crystal via signals C1 and C2. The physical monitor provides an output via bus NOBOOT.

The watchdog logic 500 also includes a bus clock monitor 502 having a frequency reference unit 503 therein. The bus clock monitor 502 is coupled to the bus clock provided to the microprocessor via signal BUS CLK and the output of the bus clock monitor is coupled to bus TAMPER.

The watchdog logic 500 also includes a processor voltage monitor 504 that is coupled to the power and bus termination voltages provided to the microprocessor from the system board via signals VDD and BUSTERM. The watchdog logic 500 additionally includes a temperature monitor 505 that is coupled to processor temperature sensing logic (not shown) via signal TEMP. The watchdog logic 500 furthermore includes a data monitor 506 that is coupled to secure code interface logic 402 via bus CHK. The outputs of the bus clock monitor 502, processor voltage monitor 504, temperature monitor 505, and data monitor 506 are coupled to bus TAMPER.

The watchdog logic 500 moreover includes a secure time stamp counter 507 that is coupled to a normal time stamp counter 508, signal CORE CLK and a ratio machine specific register (MSR) 509. The output of the secure time stamp counter 507 is coupled to bus TAMPER.

The watchdog logic 500 additionally includes an instruction monitor 511 that is coupled to an instruction array 512 and to bus INS. As noted above in the discussion with reference to FIG. 4, instructions within a secure application program are provided to the watchdog logic 500 when the microprocessor is executing in the secure execution mode to support restricted execution of instructions within the host ISA. The output of the instruction monitor is coupled to bus TAMPER.

Finally, the watchdog logic 500 has a type monitor 510 that is coupled to bus PINCHK and which generates an output over bus DESTRUCT.

Buses NOBOOT, TAMPER, and DESTRUCT are coupled to a watchdog manager 511. In one embodiment, the watchdog manager 511 generates outputs on signals CLASS1, CLASS2, CLASS 3, and DISABLE.

In operation the watchdog logic 500 is configured to perform hardware and software checks which monitor physical and temporal attributes of the microprocessor according to the present invention to detect, identify, and classify operating events that may indicate an insecure operating environment for the secure code such as changing or removing the external battery, the external crystal, or the secure non-volatile memory; replacing the secure microprocessor according to the present invention with an insecure microprocessor according to the present invention; modifying the bus clock frequency; tampering with the processor power supply (VDD); modifying the encrypted secure code either in the system memory, BIOS memory, or the secure non-volatile memory; and causing excessive calls to the secure code itself.

Accordingly, when operating in the secure mode, the physical monitor 501 determines if the secure non-volatile memory is removed by monitoring to state of signal PSNT. A deassertion of PSNT indicates removal. Similarly, signals VP1 and VP2 are monitored to determine if the external battery is either changed in voltage or removed. In one embodiment, the value of VP1 is proportional to the battery voltage. Likewise, the states of signals C1 and C2 indicate the presence or absence of the external crystal. If the physical monitor detects any of the above noted changes, then the specific change is output to bus NOBOOT.

Also, when operating in the secure mode 202, the bus clock monitor 501 evaluates the frequency of signal BUS CLK to determine both short term and long term integrity of the system bus clock which is provided to the microprocessor via the system board. The bus clock is routed to the bus clock monitor 502 via signal BUS CLK and the monitor 502 checks for short term bus clock deviations using an internal phase locked loop (not shown) which is synchronized to the bus clock and which is employed to generate an internal clock for the core microprocessor circuitry. The monitor 502 determines if the bus clock is held flat for an undue number of cycles, or if the clock-to-clock variation is more than acceptable. In one embodiment, a variation greater than six percent is deemed unacceptable. In addition the monitor 502 employs the frequency reference unit 503 as a medium speed oscillator circuit that is temperature- and voltage-independent. The monitor 502 compares a derivative of the bus clock to the output of the frequency reference unit 503 to determine if the frequency of the bus clock has experienced a gradual variation. If any of the above noted events occur, then the event is reports via bus TAMPER to the SEM logic, which will either cause the microprocessor to enter the degraded mode 203 or to enter shutdown 204.

The processor voltage monitor 504 evaluates monitor the processor power and bus termination voltages supplied to the processor and which are provided via signals VDD and BUSTERM. Low and high limits for these voltages are programmed via machine specific registers (not shown). Excursions from these programmed limits are reported via bus TAMPER.

The temperature monitor 505 includes an accurate thermal monitor mechanism that (in addition to normal thermal monitoring functions) constantly monitors die temperature against preset high and low temperature limits. The high and low temperature limits are stored within machine specific registers within the temperature monitor 505 which can be written by secure code. Excursions from the preset high and low limits are reported via bus TAMPER.

The data monitor 506 is configured to detect and report cryptographic and configuration errors associated with secure code and secure data. The errors are reported via bus TAMPER. Exemplary errors that are reported are errors associated with execution of the SEMENABLE and SEMENTER instructions, decryption errors detected when fetching the secure code from memory, and hash and format errors in the secure code.

The secure time stamp counter 507 is configured to count the number of cycles of signal CORE CLK when secure code is executing. The secure code can perform a machine specific register write to the ratio MSR 509 that establishes a maximum ratio between the value of the normal time stamp counter 508, which counts the number of cycles of signal CORE CLK during the execution of both non-secure code and secure code. If the ratio is exceeded, thereby indicating that the secure code has been called more that a prescribed number of times, then the secure time stamp counter 507 reports this event via bus TAMPER.

The instruction monitor 511 is configured to validate the instructions within the secure application program against a subset of the instructions within the host ISA, and to indicate when an instruction in that secure application program that is not within the subset has been programmed for execution. The subset of instructions which are allowed for execution within the secure execution mode is indicated by the value of the instruction array 512. In one embodiment, the subset includes one or more specific instructions within the host ISA, as identified by opcode. In another embodiment, the subset includes one or more instruction categories, as identified by a microcode complexity value. In a third embodiment, the subset includes one or more tag codes, each of which are associated with one or more instruction opcodes.

The subset of instructions for execution in the secure execution mode are identified by the value of the instruction array 512. In one embodiment, the instruction array 512 comprises a machine specific register which is initially written by the secure application program. In another embodiment, the instruction array 512 comprises a plurality of fuses which are blown during fabrication.

During initialization of the secure execution mode, as the secure code is being transferred from the secure non-volatile memory to the secure volatile memory for execution, a value corresponding to each of the instructions within the secure code is provided by the secure code interface logic via bus INS to the instruction monitor 511. In one embodiment, the value of INS directly indicates the opcode of each of the instructions. In another embodiment, the value indicates a class of instructions (e.g., simple, complex, etc.). In yet another embodiment, the value is a tag that corresponds to one or more instructions within the ISA.

In another embodiment, the value of each of the instructions within the secure code is provided by the secure code interface logic on bus INS when the secure non-volatile memory is being programmed prior to execution of the secure code.

The instruction monitor 511 compares the value of INS to the value of the instruction array 512 to determine if the particular instruction is allowed for execution. If not, then the instruction monitor 511 asserts signal TAMPER.

The type monitor 508 is provided to detect installation of a non-secure version of the microprocessor according to the present invention into a system board that is configured for a secure microprocessor according to the present invention. In one embodiment, the non-secure microprocessor and the secure microprocessor have different pinout configurations. The states of particular pins that are different between the two microprocessor versions are provided as inputs to the type monitor 508 via bus PINCHK. The type monitor evaluates the states of bus PINCHK and if it is determined that the non-secure version is installed, then this event is reported via bus DESTRUCT.

The watchdog manager 511 dynamically monitors the physical and operating environment of the microprocessor by noting and evaluating the data communicated over buses NOBOOT, TAMPER, and DESTRUCT. Certain conditions result in assertion of signal CLASS1, such as a short deviation of the frequency of BUS CLK, which is reported via TAMPER. The SEM logic, in response to assertion of CLASS1, logs the event in a secure event log in the secure volatile memory and initiates an interrupt to the secure code. If the interrupt is not acknowledged, then the watchdog manager 511 asserts signal CLASS3.

If more than one event is detected which would cause assertion of signal CLASS1, such as deviation of BUS CLK and deviation of VDD, then the watchdog manager 511 asserts signal CLASS 2. The SEM logic, in response, attempts to erase the data area of the secure volatile memory and attempts to log the event in the non-volatile secure memory. In addition, hashes of the secure code in BIOS are checked. If the data is successfully erased and the event logged, and if the BIOS hashes are verified correctly, then the SEM logic initiates a transition to the degraded mode 203, which provides for limited functionality, display of errors, and limited user input. Failure of any of these actions results in assertion of signal CLASS3.

Assertion of signal CLASS3 indicates a critical security breach. Responsive to assertion of signal CLASS3, the SEM logic continues to attempt to erase the secure volatile memory and to log the event in the secure non-volatile memory, and in addition, forces the processor into shutdown mode 204, that is the processor becomes inoperative.

In one embodiment, the watchdog manager 511 determines if the type monitor 510 has asserted signal DESTRUCT, thus indicating installation of an insecure version of the microprocessor according to the present invention. If DESTRUCT is asserted, and if the data on bus NOBOOT indicates that the external crystal and the secure non-volatile memory are present, then signal DISABLE is asserted. Responsive to assertion of signal DISABLE, the SEM logic renders the non-secure processor inoperative.

The above conditions upon which the watchdog manager 511 asserts signals CLASS1, CLASS2, CLASS3, and DISABLE are exemplary and are provided to teach secure environment management aspects of the present invention. One skilled in the art will however appreciate that classification of security events and appropriate responses are subject to the particular secure environment that is required and thus, other methods of classification and response are comprehended by the present invention.

Figure 6:
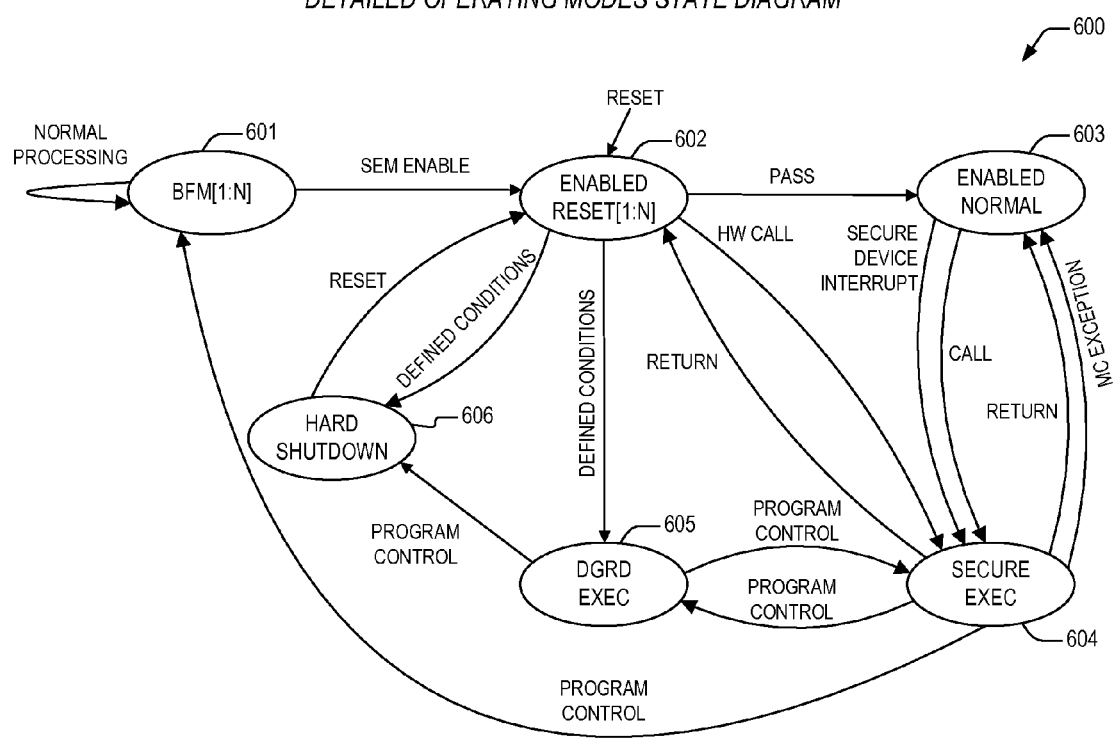
FIG. 6 is a state diagram depicting detailed operating mode transitions within the microprocessor according to the present invention.

Now turning to FIG. 6, a state diagram 600 is presented depicting detailed operating mode transitions within the microprocessor according to the present invention. The state diagram 600 includes the born free mode 601 (or, "non-secure" mode 601), the degraded mode 605, and the hard shutdown mode 606, as described for like named elements discussed with reference to FIG. 2, with the difference being that the born free mode 601 is further detailed to indicate that only a limited number of returns to this mode can occur under program control. These limited number of returns are noted as BFM[1:N]. In addition, the secure mode 202 described with reference to FIG. 2 is expanded in more detail to depict a plurality of SEM-enabled reset modes [1:N] 602, a SEM-enabled normal execution mode 603, and a SEM-enabled secure execution mode 604. That is, when secure mode 202 is enabled via execution of the SEMENABLE instruction (or alternative enablement mechanism), the microprocessor according to the present invention may be in reset (i.e., ENABLED RESET[1:N]), it may be executing non-secure applications (ENABLED NORMAL), or it may be executing secure code (SECURE EXEC).

As noted above, the microprocessor according to the present invention is fabricated to enter the born free mode 601 upon initial power up. And as the state diagram 600 indicates, the secure variant of the microprocessor may be used and continue to be employed in the born free mode ad infinitum. However, execution of the SEMENABLE instruction or alternative mechanism for enabling secure mode (i.e., SEM ENABLE) causes the microprocessor to enter a first one of the plurality of SEM-ENABLED RESET modes 602, forcing a reset of the processor. In this mode 602, during reset sequence, the processor performs configuration and integrity checks related to operating in a secure environment, as are detailed above with reference to FIG. 5. Upon successful execution (i.e. PASS) of a RESET under the SEM-ENABLED RESET mode, the processor transitions to the ENABLED NORMAL mode 603 for execution of non-secure applications. However, a if certain defined conditions are satisfied, such as are described above with reference to assertion of signals CLASS3 and DISABLE by the watchdog manager, the processor will transition to the degraded mode 605 (i.e., due to assertion of CLASS 3) or to a hard shutdown 606 (i.e., due to assertion of DISABLE). From hard shutdown 606, the processor may be RESET to cause it to return to ENABLED RESET 602. From degraded mode 605, the processor allows for limited interaction through the BIOS, allowing the user to establish parameters which enable to processor to enter ENABLED SECURE EXECUTION mode 604 under program control.

From ENABLED RESET 602, a hardware call within the reset sequence will force the processor directly into ENABLED SECURE EXECUTION mode 604, where secure code is executed. Additionally, a secure interrupt that occurs during execution of non-secure code in the ENABLED NORMAL mode 603, or execution of a SEMENTER instruction or alternative mechanism for directing the processor to begin executing secure code will cause transition to the ENABLED SECURE EXECUTION mode 604. Collectively, the instruction and alternative mechanisms for directing the processor to begin executing secure code are referred to on the state diagram 600 as a "CALL." Likewise, execution of a SEMEXIT instruction or alternative mechanism for directing the processor to terminate execution of secure code and to begin execution of non-secure code are referred to as a "RETURN" and such a RETURN causes the processor to transition to the ENABLED NORMAL state 603. As noted above, the secure code may cause the processor to transition from ENABLED SECURE EXECUTION mode 604 to DEGRADED mode 605. And secure code within BIOS may allow for the processor to return to ENABLED SECURE EXECUTION mode 604 from DEGRADED mode 605.

Finally, the secure code executing in ENABLED SECURE EXECUTION mode 604 may cause a secure machine check exception by writing to a particular machine specific register, which causes the processor to transition back to ENABLED NORMAL mode 603 for the execution of non-secure code. Additionally, if a secure device interrupt occurs in the ENABLED NORMAL mode 603, then the state of the processor automatically changes to ENABLED SECURE EXECUTION mode 604. The various steps which are performed in exemplary embodiments of the microprocessor according to the present invention to cause state transitions as described in the state diagram will be discussed in further detail below with reference to FIGS. 7-11.

Figure 7:
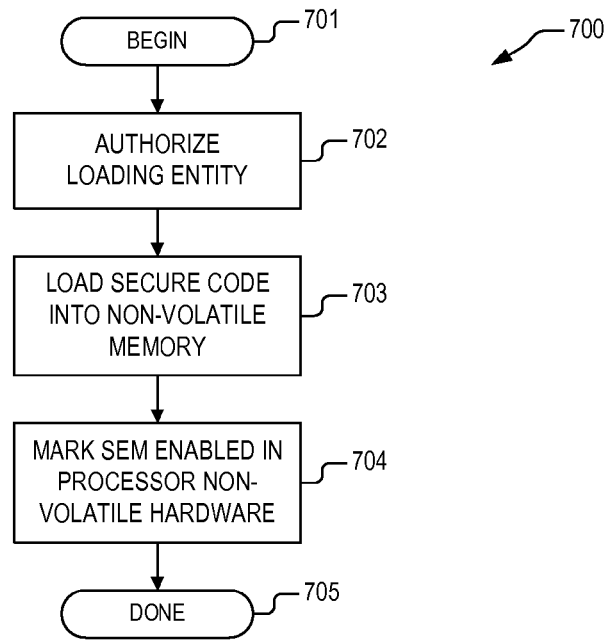
FIG. 7 is a flow chart showing a top-level method for enabling secure execution mode operation in a microprocessor according to the present invention.

Referring now to FIG. 7, a flow chart 700 is presented showing a top-level method for enabling secure execution mode operation in a microprocessor according to the present invention. Flow begins at block 701 where the microprocessor is in the born free mode 601. Via execution of a SEMENABLE instruction or alternative mechanism (such as a write to a hidden machine specific register) for enabling the secure mode, a parameter is passed which has been encrypted according to an asymmetric cryptographic algorithm using one of a pair of asymmetric cryptographic keys, the other of which has been programmed into the authorized public key register in the microprocessor. Flow then proceeds to block 702.

At block 702, utilizing the cryptographic unit within the microprocessor, the parameter is decrypted to extract a valid command to enable secure mode along with a pointer to encrypted secure code in memory. An additional pointer to secure code in BIOS may be provided as well, along with any encrypted initialization data. Flow then proceeds to block 703.

At block 703, the encrypted secure code is retrieved from memory/BIOS via the system bus and is decrypted. This secure code and data is next encrypted according to a symmetric key algorithm using a processor key that is unique to each microprocessor according to the present invention, and which is programmed into a processor key register at fabrication. The symmetrically encrypted code and data are subsequently written over a private bus that is isolated from system bus resources to a secure non-volatile memory. Part of the process of writing to the secure non-volatile memory includes performing a number of random writes to the memory prior to writing the symmetrically encrypted code and data. Flow then proceeds to block 704.

At block 704, an non-volatile enabled register within the microprocessor is written to indicate that secure mode is enabled. In one embodiment, the register comprises a plurality of bits and one of the plurality of bits is written to indicate that secure mode is enabled each time it is enabled. Another one of the bits is written to indicate a return to born free mode. Consequently, a 256-bit non-volatile register, according to one embodiment, would allow for 128 transitions from non-secure mode to secure mode. Flow then proceeds to block 705.

At block 705, a processor reset is forced and the method completes.

Figure 8:
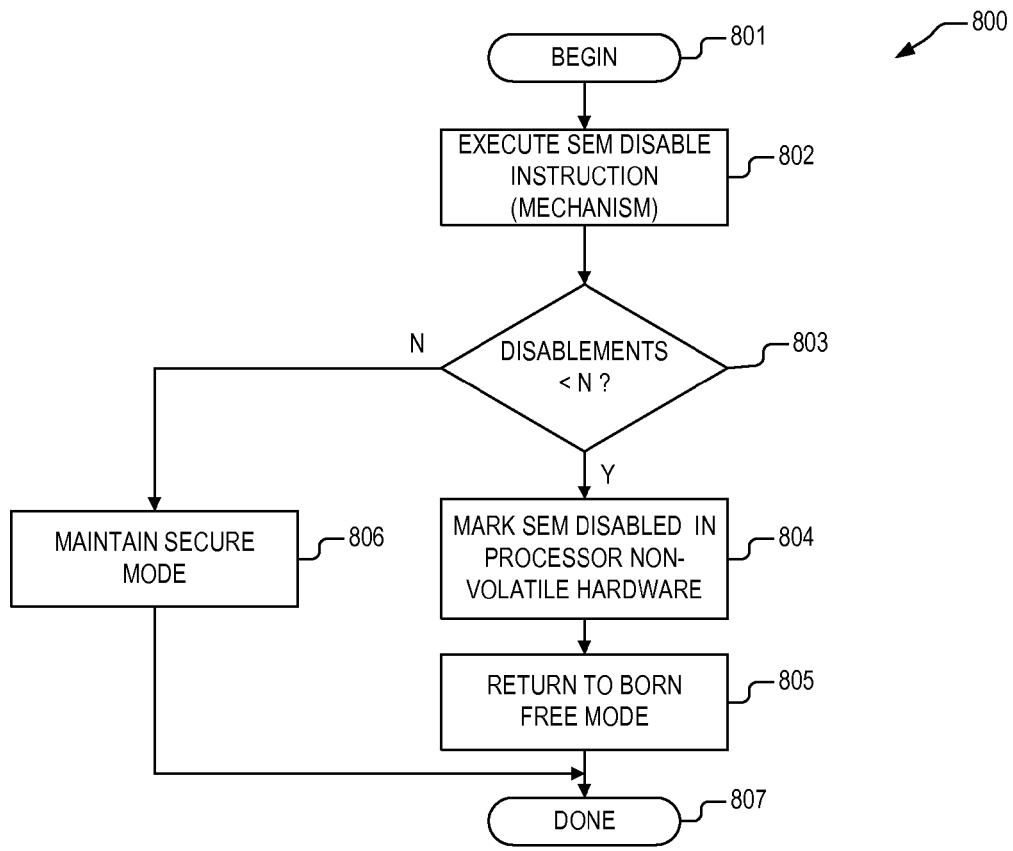
FIG. 8 is a flow chart highlighting a top-level method for disabling secure execution mode operation in a microprocessor according to the present invention.

FIG. 8 is a flow chart 800 highlighting a top-level method for disabling secure execution mode operation in a microprocessor according to the present invention. That is, the flow chart 800 depicts how secure code operating in the secure mode may direct the microprocessor to return to the born free mode. Flow begins at block 801 where secure code is executing in the secure mode. Flow then proceeds to block 802.

At block 802, the secure code executes a return to non-secure mode. In one embodiment, a return to non-secure mode is initiated when the secure code performs a write to a SEM control machine specific register that causes a secure exception. Program control is then transferred to a secure exception handler within the secure code at an address indicated by contents of the secure interrupt descriptor table discussed previously. In one embodiment, the secure exception handler performs a write to a confirmation machine specific register to indicate acceptance of the return. If the confirmation register is not correctly written, then the return is ignored and the processor remains in the secure mode. If the handshake is confirmed, then flow proceeds to decision block 803.

At decision block 803, contents of the non-volatile enable register are evaluated to determine if secure mode can or cannot be disabled. If not, then flow proceeds to block 806. If bits remain in the register to allow for a return to non-secure mode, then flow proceeds to block 804.

At block 806, the secure mode is maintained and control returns to the secure code. Flow then proceeds to block 807.

At block 804, the non-volatile enable register is updated to indicate that the processor is operating in non-secure mode. Flow then proceeds to block 805.

At block 805, the state of the processor is returned to the born free mode. Flow then proceeds to block 806.

At block 806, the method completes.

Figure 9:
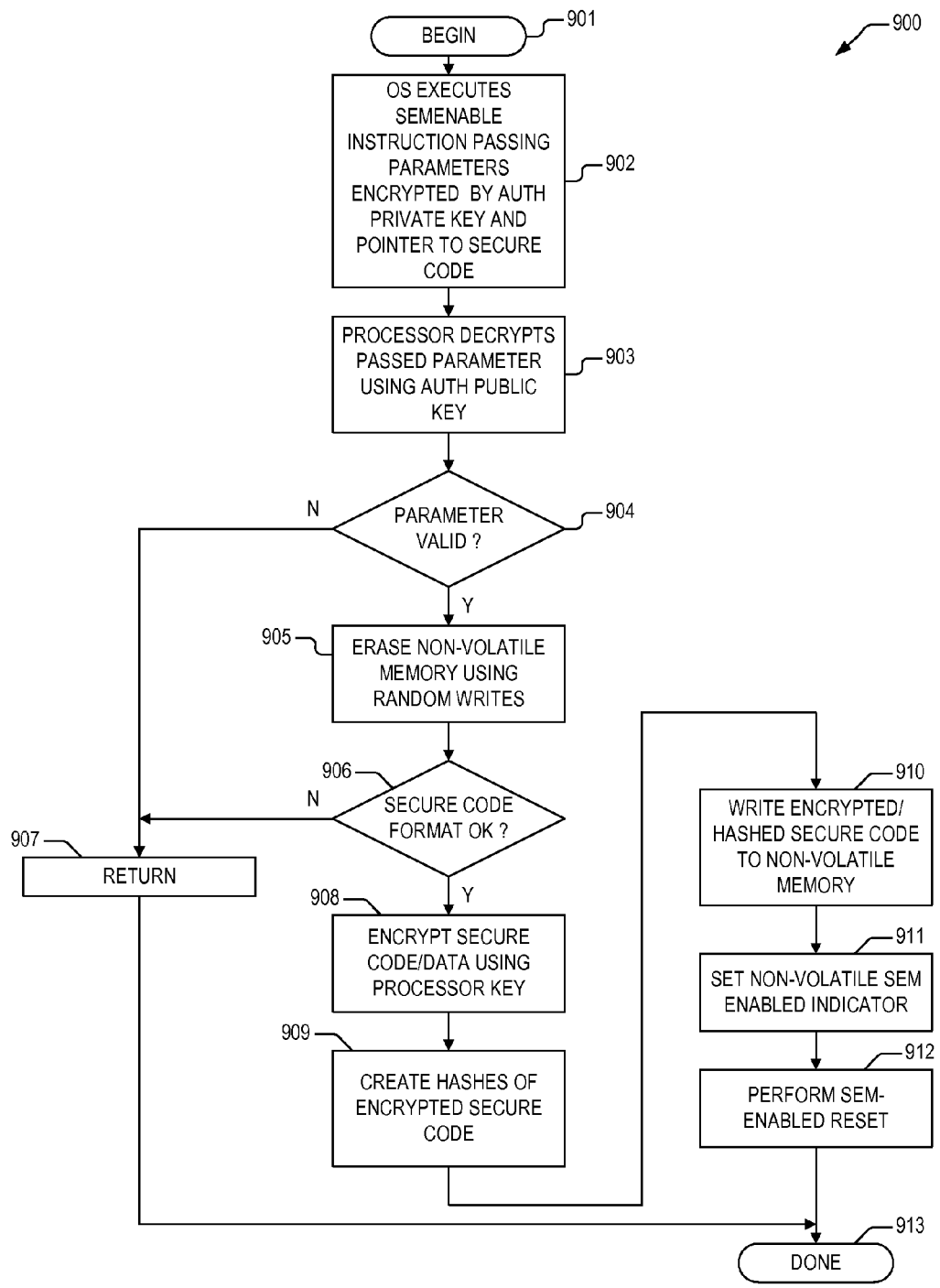
FIG. 9 is a flow chart featuring a detailed method for initializing execution of secure code in a microprocessor according to the present invention.

FIG. 9 is a flow chart 900 featuring a detailed method for initializing execution of secure code in a microprocessor according to the present invention. That is, the method of this flow chart 900 includes further details beyond that taught by the flow chart 700 of FIG. 7. Flow begins at block 901 where a microprocessor according to the present invention is executing a non-secure application in the born free mode. Flow then proceeds to block 902.

At block 902, an operating system executing in the non-secure mode executes a SEMENABLE instruction or alternative mechanism, such as a write to a machine specific register, that passes or otherwise transfers one or more parameters which have been asymmetrically encrypted according to a private key belonging to an authorizing party. The one or more parameters include a pointer to asymmetrically encrypted secure code to be executed, which may be stored in system memory and/or BIOS memory. Flow then proceeds to block 903.

At block 903, the microprocessor employs a corresponding public key to decrypt the passed one or more parameters. In one embodiment, the public key is programmed during fabrication of the microprocessor into a non-volatile authorized public key register. In an alternative embodiment, the public key is programmed into a location in a secure non-volatile memory according to the present invention and upon initial power-up of the microprocessor, the public key is fetched from the secure non-volatile memory, the key programmed into the non-volatile authorized public key register, and then the location in the secure non-volatile memory is erased. Flow then proceeds to decision block 904.

At decision block 904, an evaluation is made to determine if the decrypted parameter is valid. If so, then flow proceeds to block 905. If not, then flow proceeds to block 907.

At block 905, since it was determined that the parameter is valid, the contents of the secure non-volatile memory are erased by performing a plurality of random writes to all locations. Flow then proceeds to decision block 908.

At decision block 908, the encrypted secure code is fetched from the system memory and/or BIOS memory. The code is then decrypted according to the asymmetric key algorithm using the authorized public key. In one embodiment, a cryptographic unit within execution logic in the microprocessor is employed to decrypt the code. In one embodiment, the cryptographic unit is capable of performing AES cryptographic operations, SHA-1 hash operations, and RSA cryptographic operations. The decrypted code is then decompressed and checked to determine if it is provided according to a predefined format. If the decrypted code format is correct, then flow proceeds to block 908. If the decrypted code format is not correct, then flow proceeds to block 907.

At block 907, since the decrypted parameter is invalid, program control is returned to the operating system executing in non-secure mode. Flow then proceeds to block 913.

At block 908, the decrypted code (and corresponding initialization data, if any) is encrypted according to a symmetric key algorithm using a symmetric key that is unique to the microprocessor and which was programmed into a non-volatile processor key register at fabrication. In one embodiment, the key is a 128-bit AES key and the microprocessor employs its cryptographic unit to perform AES encryption of the code. Flow then proceeds to block 909.

At block 909, the microprocessor creates one or more hashes of one or more sections of the encrypted code. In one embodiment, the cryptographic unit within the microprocessor is employed to create one or more SHA-1 hashes of the encrypted code. Flow then proceeds to block 910.

At block 910, the microprocessor writes the encrypted secure code (and data, if any) and the one or more hashes to the secure non-volatile memory over a private serial bus that is isolated from system bus resources. The code and data are encrypted, thus precluding detection of the content of the secure code. Flow then proceeds to block 911.

At block 911, an indicator within a non-volatile secure mode enabled register is set to indicate that secure mode is enabled. Flow then proceeds to block 912.

At block 912, a secure mode enabled reset sequence is performed within the microprocessor. The sequence includes hardware checks as are described in the discussion referring to the watchdog logic of FIG. 5 and initialization of the secure volatile memory to random values. Flow then proceeds to block 913.

At block 913, the method completes.

Figure 10:
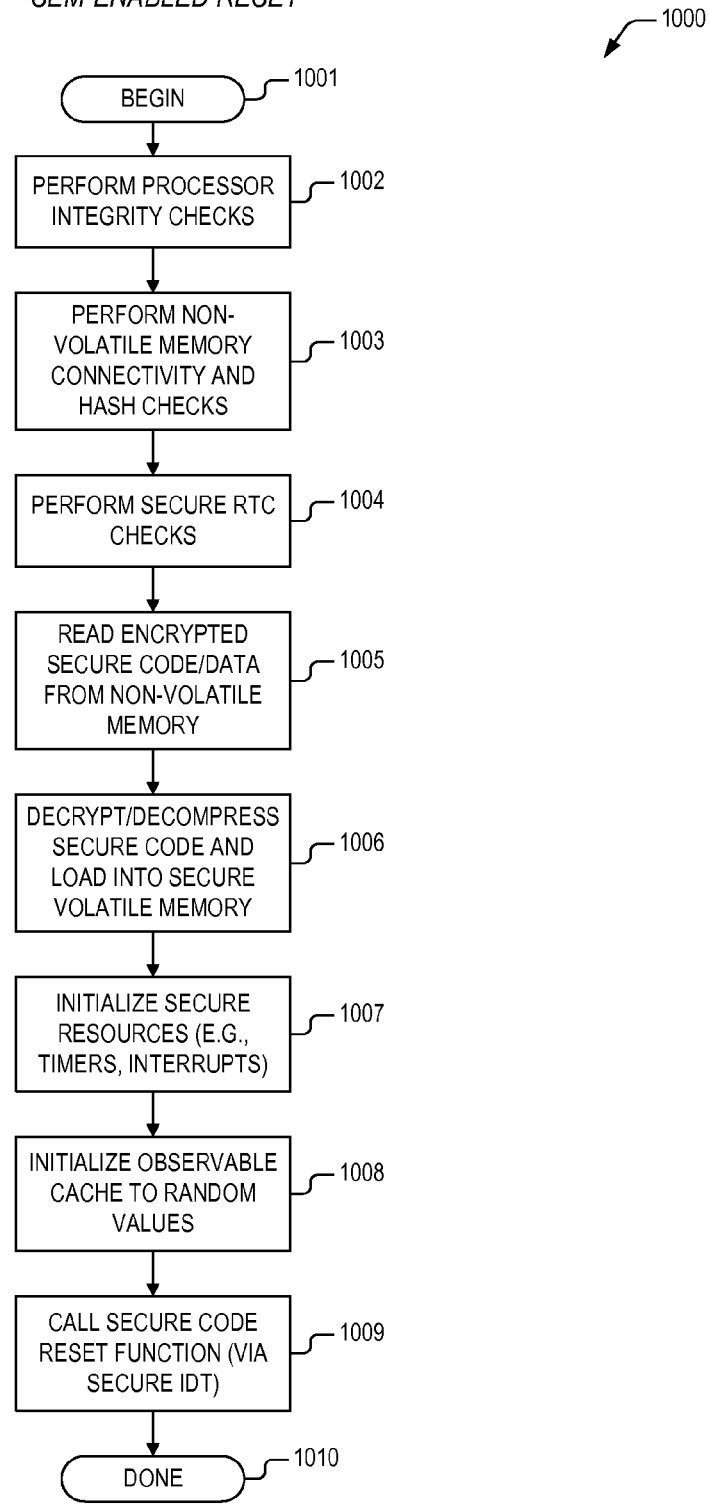
FIG. 10 is a flow chart featuring a method for performing a reset operation in a microprocessor according to the present invention that has been enabled for SEM operation.

Turning now to FIG. 10, a flow chart 1000 is presented featuring a method for performing a secure mode enabled reset operation in a microprocessor according to the present invention that has been enabled for SEM operation. Flow begins at block 1001 where the secure mode enabled reset is forced by the microprocessor as it completes initialization of the secure mode. Flow then proceeds to block 1002.

At block 1002, the processor performs a number of processor integrity checks to include detection and validation of the secure non-volatile memory, the external battery, and the external crystal. In addition, the presence and frequency integrity of the bus clock is verified along with validation of proper voltages applied for bus termination and processor power supply. The temperature of the processor is confirmed to be within an acceptable range. Flow then proceeds to block 1003.

At block 1003, the processor reads and decrypts a secure signature from a location in the secure non-volatile memory. The decrypted signature is verified to confirm that the memory has not been compromised. In addition, specific portions of the secure non-volatile memory along with corresponding hashes are read. Via the cryptography (i.e., AES/Hash/RSA) unit, verification hashes of the selected portions are generated and then compared with the hashes that were read. Flow then proceeds to block 1004.

At block 1004, correct operation of the secure real time clock is confirmed as well. In one embodiment, the secure execution mode real time clock evaluates the status of the external crystal to detect a change in frequency greater than five percent, thus indicating compromise of the crystal and any change in the external battery voltage greater than five percent, thus indicating a potential security threat. If any of the above checks produce adverse results, the secure mode enabled reset sequence will cause either the event to be logged, or will force the processor into the degraded mode, or will cause a hard shutdown, depending upon the severity and number of detected events. Flow then proceeds to block 1005.

At block 1005, the secure code is retrieved from system memory and/or BIOS memory. Flow then proceeds to block 1006.

At block 1006, the secure code is decrypted and decompressed and is verified for proper formatting. The secure code is then loaded into the secure volatile memory within the microprocessor. Flow then proceeds to block 1007.

At block 1007, secure resources within the microprocessor are initialized. These secure resources are cannot be observed or accessed by non-secure code, and are available only to secure code executing in the secure mode. These resources include secure timers, secure interrupts and exceptions, to include a secure interrupt descriptor table, and any secure machine specific registers or other registers that must be initialized for execution of the secure code. Initialization also includes disablement of non-secure interrupt, exception, debug, and trace logic, along with disablement of any power management features of the microprocessor to include any elements which may cause a change in core voltage, core clock frequency, or which may enable or disable other elements such as caches, branch prediction units, etc. Flow then proceeds to block 1008.

At block 1008, the non-secure caches (i.e., L1 cache, L2 cache) within the microprocessor are initialized to random values. Flow then proceeds to block 1009.

At block 1009, a secure mode interrupt is generated and a secure code reset is called based upon the data resident in the secure mode interrupt descriptor table which was initialized according to block 1007. Flow then proceeds to block 1010.

At block 1010, the method completes.

Figure 11:
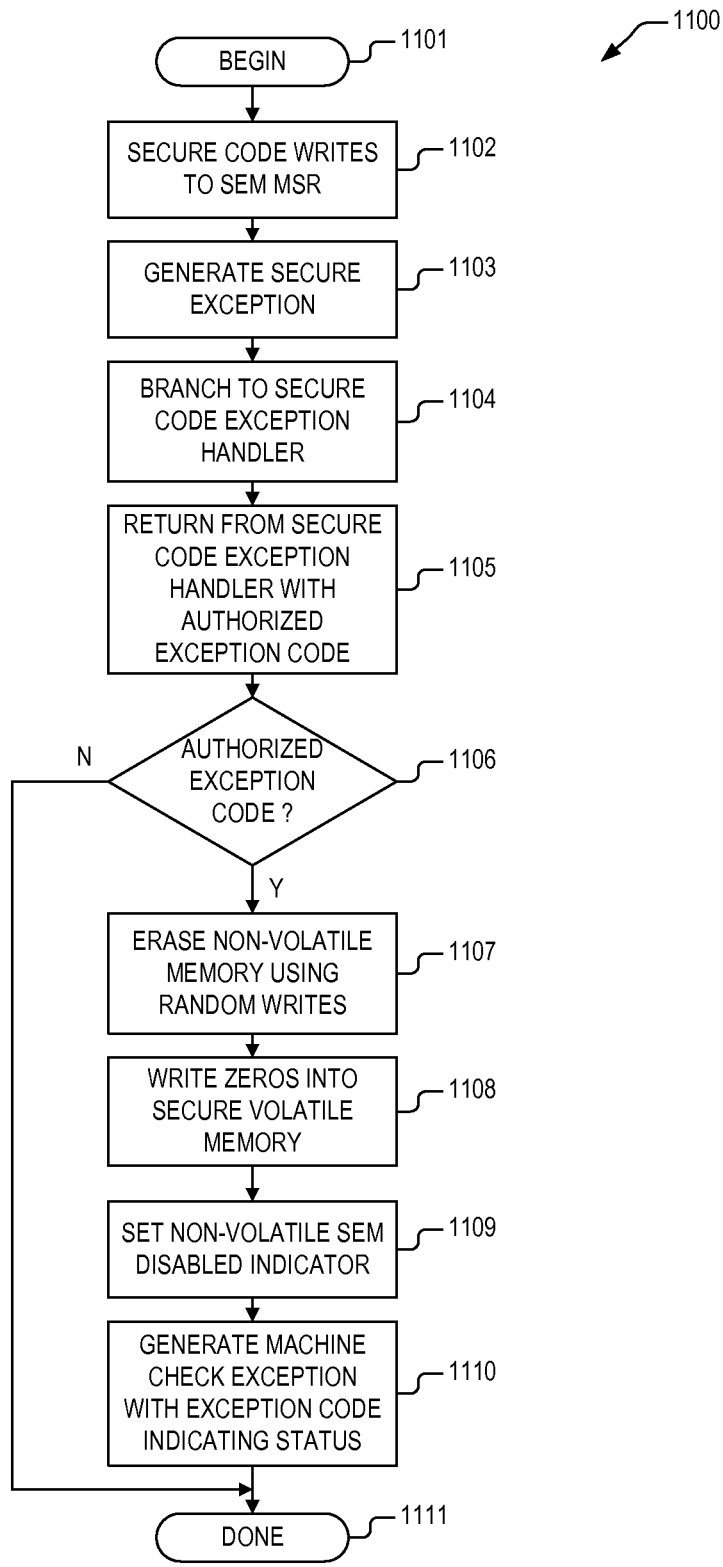
FIG. 11 is a flow chart featuring a detailed method for terminating secure execution mode operation in a microprocessor according to the present invention.

Turning now to FIG. 11, a flow chart 1100 is presented featuring a detailed method for terminating secure execution mode operation in a microprocessor according to the present invention. The method begins at block 1101 where secure code is executing within the secure mode. In summary, there are three ways according to the present invention for a microprocessor to transition from non-secure mode to secure mode, and to begin execution of secure code. A first way allows for program control to transition to the execution of secure code. That is, a non-secure program in secure mode executes as SEMENTER instruction. In one embodiment, the SEMENTER instruction is causes the state of the microprocessor to be saved on a stack in the secure volatile memory and program control transferred to the secure code, very much like operation of the x86 SYSENTER instruction. A second way to cause the execution of secure code results from an interrupt or exception when performing a non-secure or secure reset sequence. A final way of causing the execution of secure code results from an interrupt from any number of secure watchdog logic elements such as are discussed with reference to FIG. 5.

The secure code that is executed in secure mode, as noted above, resides permanently in the secure non-volatile memory, but has been loaded during a secure mode enabled reset sequence into the secure volatile memory. That is, the secure code is never executed from non-secure memory such as the system memory or non-secure processor caches. Consequently, execution control is transferred from secure mode back to non-secure mode by two ways. The first way comprises executing an SRESUME instruction which cause a return from the SEMENTER instruction. In an x86 embodiment, the SRESEME instruction operates in a manner similar to an x86 RESUME instruction. That is, the program state which was previously stored in the secure volatile memory is restored and program control is transferred back to the operating system, or non-secure code. A second way contemplates forcing a secure exception that is accessible to the secure elements of the processor through writing a machine specific register which is accessible only to secure code. If it is confirmed that the microprocessor is to return to the non-secure mode, then a non-secure machine check exception is generated which is noted and processed by the operating system, thus affecting a return to non-secure mode. The flow chart 1100 of FIG. 11 addresses forcing the secure exception to return to non-secure mode, although one skilled in the art will appreciate that execution of the SRESUME instruction causes the microprocessor to perform similar steps as are described below.

Accordingly, flow continues at block 1102, where the secure code executes an instruction causing a write to a SEM MSR, that is, one of a plurality of machine specific registers which are accessible and visible only to secure code executing in the secure mode. Flow then proceeds to block 1103.

At block 1103, writing the SEM MSR causes a secure exception which is processed by secure exception logic within the SEM logic. Flow then proceeds to block 1104.

At block 1104, the secure exception logic (e.g., the secure interrupt descriptor table) causes program control to branch to a secure exception handler within the secure code. Flow then proceeds to block 1105.

At block 1105, the secure exception handler executes a return back to the secure code, passing an authorized exception code back to the secure code. Flow then proceeds to decision block 1106.

At decision block 1106, an evaluation is made to determine if the exception code returned by the secure exception handler is correct. If not, then a security risk is assumed, and flow proceeds to block 1111. If the code is correct, then a handshake between the secure code and the secure exception handler is confirmed and flow proceeds to block 1107.

At block 1107, the microprocessor purges the contents of the secure non-volatile memory by performing a plurality of random writes to all locations therein. Flow then proceeds to block 1108.

At block 1108, the microprocessor erases each location in the secure non-volatile memory by writing zeros to each location therein. Flow then proceeds to block 1109.

At block 1109, the non-volatile enabled register is written to indicate that secure mode is disabled, subject to the number of times which secure mode may be disabled, as was previously discussed with reference to the method of FIG. 8. Flow then proceeds to block 1110.

At block 1110, the secure exception logic generates a machine check exception and in addition returns a status parameter. Thus, the operating system in non-secure mode processes the machine check exception, and a return to non-secure mode is accomplished. Flow then proceeds to block 1111.

At block 1111, the method completes.

Figure 12:
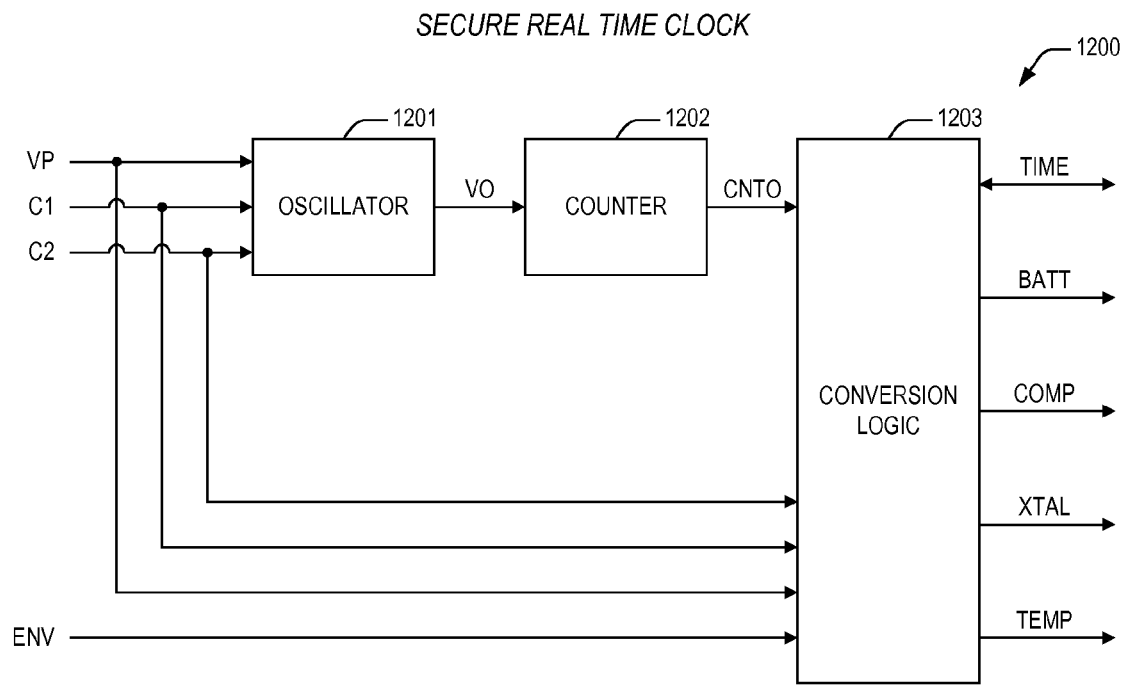
FIG. 12 is a block diagram showing details of a secure real time clock in the microprocessor according to the present invention.

FIG. 12 is a block diagram showing details of a secure real time clock (RTC) 1200 that is within the SEM logic in the microprocessor according to the present invention. The secure RTC 1200 is exclusively visible to and accessible by secure code which is operating in the secure mode. The secure RTC is comprises an oscillator 1201 that is coupled to the external battery via signal VP and to an external crystal via signals C1 and C2. The oscillator generates an output on signal VO which is coupled to a counter 1202. The counter generates and output on bus CNTO which is routed to conversion logic 1203. Signals VP, C1, and C2 are also input to the conversion logic 1203, along with a signal ENV, which carries a value corresponding to the die temperature. The conversion logic 1203 generates outputs that are provided over signals TIME, BATT, COMP, XTAL, and bidirectional bus TIME. The microprocessor provides inputs to the secure RTC via bus TIME.

The oscillator 1201 and counter 1202 are dedicated, that is they share no other circuitry with any other elements of the microprocessor except for elements which are provided to allow the processor to read and write the secure RTC via bus TIME. In addition, the secure RTC continues its count as long as the external battery provides an acceptable voltage via signal VP. In an alternative embodiment, voltage VP is generated by a capacitor on the system board provided in place of the battery which is kept charged as long as the system board is powered up.

In operation, the oscillator 1201 generates an oscillating voltage output that is proportional to the frequency of the external crystal and which is provided to the counter 1202. The counter 1202 includes elements that count the number of cycles provided via signal VO. The count is provided on signal CNTO. The conversion logic 1203 includes circuits that convert the value of CNTO to a time value, and additionally includes registers (not shown) which can be read and written by the processor via bus TIME.

In addition, the conversion logic 1203 is configured to detect a significant variation of voltage VP, indicating tampering, and such an event is indicated by assertion of signal BATT which is employed to interrupt the secure code that is executing. In one embodiment, a variation of greater than five percent causes the BATT interrupt to be asserted.

The conversion logic 1203 is also configured to detect a significant variation of the crystal frequency via signals C1 and C1, thus indicating a potential tamper, and such an event is indicated by assertion of signal XTAL, which is employed to interrupt the secure code that is executing. In one embodiment, a variation of greater than five percent causes the XTAL interrupt to be asserted.

The signal ENV is evaluated by the conversion logic 1203 to determine temperature excursions that might make the count generated by the counter 1202 inaccurate. If so, then signal TEMP is asserted, which is employed to interrupt the secure code that is executing.

The conversion logic 1203 is also configured to evaluate if any of the above noted conditions are significant enough to indicate that the secure RTC has been compromised, such as removal and replacement of the external battery. If this is determined, then signal COMP is asserted as well, thus interrupting execution of the secure code.

The present invention provides a number of advantages over present day techniques for executing application programs within a secure environment. For example, the design according to the present invention is processor based. That is, it is an object of the present invention to modify the design of the processor responsible for executing the secure code because, in contrast to other techniques that focus on modifying chipsets or other components, only the processor can provide real execution security. Approaches using separate chips to monitor the processor have a number of inherent security flaws, as well as significantly degraded performance for security related execution.

According to an x86 based embodiment of the present invention, the development of secure code is greatly simplified due to the ubiquitous nature of x86 programming skills. The x86 architecture is well known and the addition of machine specific instructions and special instructions such as the SEMENABLE, SEMENTER, and SRESUME instructions provide only a minor learning challenge to any programmer well versed in the development of non-secure x86 applications.

Furthermore, the cost of addition secure execution capabilities to a microprocessor is far less than what would be exhibited if additional chips were added to a system design.

Moreover, since the secure execution environment is provided within the processor itself, it is inherently resistant against those physical or side-channel attacks which would otherwise require a significant investment in additional external circuits.

Very advantageously, the techniques disclosed herein provide for a secure microprocessor operating environment where no universal secret (such as a universal cryptographic key, or program structure) is stored which could be compromised. That is, each processor according to the present invention has only the secrets needed to authorize, control, etc. that particular processor or system. The secrets from one processor/system will not break security on another processor/system. Further, knowing how to break security on one processor should not make it any easier to break security on other processors. This is due to the unique processor key that is provided and resulting from transactions over the secure non-volatile memory bus which are encrypted using that key.

The processor according to the present invention is additionally advantages over prior techniques in that protection against so called denial-of-service attacks is provided. For example, as discussed with reference to FIG. 5, secure watchdog elements are provided to detect and take action on events such as continuous calls to the secure execution environment (from a rogue device driver, for example), continuous "removal" of the RTC battery, crystal, and etc.

Those skilled in the art should appreciate that they can readily use the disclosed conception and specific embodiments as a basis for designing or modifying other structures for carrying out the same purposes of the present invention, and that various changes, substitutions and alterations can be made herein without departing from the scope of the invention as defined by the appended claims.

What is claimed is:

1. An apparatus providing for a secure execution environment, comprising:
a microprocessor, coupled to a system bus, configured to execute non-secure application programs and a secure application program, wherein said non-secure application programs are accessed from a system memory via said system bus, and wherein said microprocessor is also configured to automatically transition to a degraded mode where only BIOS instructions are allowed to execute in order to allow for user input and the display of messages, said microprocessor comprising:
a non-secure memory, configured to store portions of said non-secure application programs for execution by the microprocessor, wherein said non-secure memory is observable and accessible by said non-secure application programs and by system bus resources within said microprocessor;
a secure volatile memory, configured to store said secure application program for execution by said microprocessor, wherein said secure volatile memory is isolated from said non-secure application programs and said system bus resources within said microprocessor, and wherein said secure application program is retrieved from a secure non-volatile memory over a private bus, decrypted using a processor unique key, and is written to said secure volatile memory;
a cryptographic unit, isolated from said system bus and disposed within execution logic in said microprocessor, configured to employ said processor unique key to decrypt said secure application program; and
a processor key register, coupled to said cryptographic unit, configured to store said processor unique key, wherein said processor key register can only be read by said cryptographic unit.

2. The apparatus as recited in claim 1, wherein said secure volatile memory comprises an instruction cache and a data cache for said secure application program.

3. The apparatus as recited in claim 1, wherein said secure volatile memory comprises a stack for storage and retrieval of the state of said microprocessor corresponding to said non-secure application programs.

4. The apparatus as recited in claim 1, wherein said secure application program accesses said secure volatile memory to read and write secure data by employing load and store instructions.

5. The apparatus as recited in claim 4, wherein said load and store instructions reference segment registers in address logic which are initialized upon entry into secure execution to point to said secure volatile memory instead of said system memory.

6. The apparatus as recited in claim 1, wherein said secure volatile memory comprises a 64-bit cache memory having 4096 locations, and wherein each of said locations comprises an internal attribute that completely isolates each of said locations.

7. The apparatus as recited in claim 1, further comprising:
SEM logic, coupled to said secure volatile memory and to address logic in said microprocessor, configured to disable virtual address translation by said address logic when said microprocessor is executing said secure application program.

8. The apparatus as recited in claim 7, wherein, upon execution of a secure mode enabled reset sequence by said microprocessor, said SEM logic initializes said secure volatile memory to random values.

9. A microprocessor apparatus, for executing secure code within a secure execution environment, the microprocessor apparatus comprising:
a secure non-volatile memory, coupled to a private bus, configured to store a secure application program; and
a microprocessor, coupled to said private bus, configured to execute non-secure application programs and said secure application program, wherein said non-secure application programs are accessed from a system memory via a system bus, and wherein said secure application program is accessed from said secure non-volatile memory, and wherein transactions over said private bus are isolated from said system bus and corresponding system bus resources within said microprocessor, and wherein said microprocessor is also configured to automatically transition to a degraded mode where only BIOS instructions are allowed to execute in order to allow for user input and the display of messages, said microprocessor comprising:
a non-secure memory, configured to store portions of said non-secure application programs for execution by said microprocessor, wherein said non-secure memory is observable and accessible by said non-secure application programs and by system bus resources within said microprocessor, and;
a secure volatile memory, configured to store said secure application program for execution by said microprocessor, wherein said secure volatile memory is isolated from said non-secure application programs and said system bus resources within said microprocessor, and wherein said secure application program is retrieved from said secure non-volatile memory, decrypted using a processor unique key, and is written to said secure volatile memory;
a cryptographic unit, isolated from said system bus and disposed within execution logic in said microprocessor, configured to employ said processor unique key to decrypt said secure application program; and
a processor key register, coupled to said cryptographic unit, configured to store said processor unique key, wherein said processor key register can only be read by said cryptographic unit.

10. The microprocessor apparatus as recited in claim 9, wherein said secure volatile memory comprises an instruction cache and a data cache for said secure application program.

11. The microprocessor apparatus as recited in claim 9, wherein said secure volatile memory comprises a stack for storage and retrieval of the state of said microprocessor corresponding to said non-secure application programs.

12. The microprocessor apparatus as recited in claim 9, wherein said secure application program accesses said secure volatile memory to read and write secure data by employing load and store instructions.

13. The microprocessor apparatus as recited in claim 12, wherein said load and store instructions reference segment registers in address logic which are initialized upon entry into secure execution to point to said secure volatile memory instead of said system memory.

14. The microprocessor apparatus as recited in claim 9, wherein said secure volatile memory comprises a 64-bit cache memory having 4096 locations, and wherein each of said locations comprises an internal attribute that completely isolates each of said locations.

15. The microprocessor apparatus as recited in claim 9, further comprising:
SEM logic, coupled to said secure volatile memory and to address logic in said microprocessor, configured to disable virtual address translation by said address logic when said microprocessor is executing said secure application program.

16. The microprocessor apparatus as recited in claim 15, wherein, upon execution of a secure mode enabled reset sequence by said microprocessor, said SEM logic initializes said secure volatile memory to random values.

17. A method for executing secure code within a secure execution environment, the method comprising:
providing a secure non-volatile memory for storage of the secure code;
storing the secure code within the secure non-volatile memory via private transactions accomplished over a private bus that is coupled to the secure non-volatile memory; and
fetching the secure code from the secure non-volatile memory over the private bus for execution by a microprocessor, and employing a cryptographic unit disposed within the microprocessor to decrypt the secure code using a processor unique key, wherein the processor unique key is stored in a processor key register within the microprocessor, and wherein the processor key register can only be read by the cryptographic unit, and storing the secure code in a secure volatile memory, wherein the secure volatile memory and the cryptographic unit are isolated from non-secure code and system bus resources within the microprocessor, and wherein the microprocessor is also configured to automatically transition to a degraded mode where only BIOS instructions are allowed to execute in order to allow for user input and the display of messages;
wherein the private bus is isolated from all system bus resources within the microprocessor and external to the microprocessor, and wherein the private bus is observable and accessible exclusively by secure execution logic within the microprocessor.

18. The method as recited in claim 17, wherein said storing said secure code in a secure volatile memory comprises employing the secure volatile memory as an instruction cache and a data cache.

19. The method as recited in claim 17, wherein the secure volatile memory comprises a stack for storage and retrieval of the state of the microprocessor corresponding to the non-secure code.

20. The method as recited in claim 17, wherein the secure code accesses the secure volatile memory to read and write secure data by employing load and store instructions.

21. The method as recited in claim 20, wherein the load and store instructions reference segment registers in address logic which are initialized upon entry into secure execution to point to the secure volatile memory instead of system memory.

22. The method as recited in claim 17, wherein the secure volatile memory comprises a 64-bit cache memory having 4096 locations, and wherein each of the locations comprises an internal attribute that completely isolates each of the locations.

23. The method as recited in claim 17, further comprising:
via SEM logic that is coupled to the secure volatile memory and to address logic in the microprocessor, disabling virtual address translation by the address logic when the microprocessor is executing the secure code.

24. The method as recited in claim 23, wherein, upon execution of a secure mode enabled reset sequence by the microprocessor, initializing the secure volatile memory to random values.

* * * * *